United States Patent
Zuev et al.

(10) Patent No.: US 9,495,358 B2
(45) Date of Patent: Nov. 15, 2016

(54) CROSS-LANGUAGE TEXT CLUSTERING

(71) Applicant: ABBYY InfoPoisk LLC, Moscow (RU)

(72) Inventors: Konstantin Zuev, Moscow (RU); Tatiana Danielyan, Moscow (RU)

(73) Assignee: ABBYY InfoPoisk LLC (RU)

( * ) Notice: Subject to any disclaimer, the term of this patent is extended or adjusted under 35 U.S.C. 154(b) by 152 days.

(21) Appl. No.: 13/648,527

(22) Filed: Oct. 10, 2012

(65) Prior Publication Data

US 2013/0041652 A1  Feb. 14, 2013

Related U.S. Application Data

(63) Continuation-in-part of application No. 13/535,638, filed on Jun. 28, 2012, and a continuation-in-part of application No. 12/983,220, filed on Dec. 31, 2010, and a continuation-in-part of application No. 11/548,214, filed on Oct. 10, 2006, now Pat. No. 8,078,450.

(51) Int. Cl.
 *G06F 17/27* (2006.01)
 *G06F 17/28* (2006.01)

(52) U.S. Cl.
 CPC ......... *G06F 17/277* (2013.01); *G06F 17/2755* (2013.01); *G06F 17/2785* (2013.01); *G06F 17/2872* (2013.01); *G06F 17/271* (2013.01)

(58) Field of Classification Search
 CPC .............. G06F 17/2785; G06F 17/277; G06F 17/271; G06F 17/27; G06F 17/2705; G06F 17/2755
 USPC .......................................................... 704/9
 See application file for complete search history.

(56) References Cited

U.S. PATENT DOCUMENTS

| | | | |
|---|---|---|---|
| 4,914,590 A * | 4/1990 | Loatman et al. ................. 704/8 |
| 5,268,839 A | 12/1993 | Kaji | |
| 5,301,109 A | 4/1994 | Landauer et al. | |
| 5,386,556 A | 1/1995 | Hedin et al. | |
| 5,418,717 A | 5/1995 | Su et al. | |
| 5,426,583 A | 6/1995 | Uribe-Echebarria Diaz De Mendibil | |

(Continued)

FOREIGN PATENT DOCUMENTS

| | | |
|---|---|---|
| EP | 2400400 A1 | 12/2001 |
| EP | 1365329 B1 | 10/2009 |
| WO | 2011160204 A1 | 12/2011 |

OTHER PUBLICATIONS

Bolshakov, I.A. "Co-Ordinative Ellipsis in Russian Texts: Problems of Description and Restoration" Proceedings of the 12th conference on Computational linguistics, Volue 1, pp. 65-67. Association for Computational Linguistics 1988.

(Continued)

*Primary Examiner* — Samuel G Neway
(74) *Attorney, Agent, or Firm* — Veronica Weinstein

(57) ABSTRACT

Methods are described for performing clustering or classification of texts of different languages. Language-independent semantic structures (LISS) are constructed before clustering is performed. These structures reflect lexical, morphological, syntactic, and semantic properties of texts. The methods suggested are able to perform cross-language text clustering which is based on the meaning derived from texts. The methods are applicable to genre classification, topic detection, news analysis, authorship analysis, internet searches, and creating corpora for other tasks, etc.

23 Claims, 19 Drawing Sheets

(56) References Cited

U.S. PATENT DOCUMENTS

| | | |
|---|---|---|
| 5,497,319 A | 3/1996 | Chong et al. |
| 5,669,007 A | 9/1997 | Tateishi |
| 5,677,835 A | 10/1997 | Carbonell et al. |
| 5,678,051 A | 10/1997 | Aoyama |
| 5,687,383 A | 11/1997 | Nakayama et al. |
| 5,715,468 A | 2/1998 | Budzinski |
| 5,729,741 A | 3/1998 | Liaguno et al. |
| 5,752,051 A | 5/1998 | Cohen |
| 5,768,603 A | 6/1998 | Brown et al. |
| 5,787,410 A | 7/1998 | McMahon |
| 5,794,050 A | 8/1998 | Dahlgren et al. |
| 5,826,219 A | 10/1998 | Kutsumi |
| 5,867,811 A | 2/1999 | O'Donoghue |
| 5,884,247 A | 3/1999 | Christy |
| 5,930,746 A * | 7/1999 | Ting .................. 704/9 |
| 5,995,920 A | 11/1999 | Carbonell et al. |
| 6,006,221 A * | 12/1999 | Liddy et al. |
| 6,055,528 A | 4/2000 | Evans |
| 6,076,051 A | 6/2000 | Messerly et al. |
| 6,081,774 A * | 6/2000 | de Hita et al. ............ 704/9 |
| 6,161,083 A | 12/2000 | Franz et al. |
| 6,182,028 B1 | 1/2001 | Karaali et al. |
| 6,233,544 B1 | 5/2001 | Alshawi |
| 6,233,546 B1 | 5/2001 | Datig |
| 6,243,670 B1 | 6/2001 | Bessho et al. |
| 6,243,723 B1 | 6/2001 | Ikeda et al. |
| 6,246,977 B1 | 6/2001 | Messerly et al. |
| 6,275,789 B1 | 8/2001 | Moser et al. |
| 6,295,543 B1 * | 9/2001 | Block et al. .............. 715/234 |
| 6,345,245 B1 | 2/2002 | Sugiyama et al. |
| 6,349,276 B1 | 2/2002 | McCarley et al. |
| 6,356,864 B1 | 3/2002 | Foltz et al. |
| 6,381,598 B1 | 4/2002 | Williamowski et al. |
| 6,442,524 B1 | 8/2002 | Ecker et al. |
| 6,463,404 B1 * | 10/2002 | Appleby .................. 704/9 |
| 6,523,026 B1 | 2/2003 | Gillis et al. |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,631,346 B1 * | 10/2003 | Karaorman et al. .......... 704/9 |
| 6,658,627 B1 | 12/2003 | Gallup et al. |
| 6,751,606 B1 | 6/2004 | Fries et al. |
| 6,778,949 B2 | 8/2004 | Duan et al. |
| 6,871,199 B1 | 3/2005 | Binnig et al. |
| 6,901,402 B1 | 5/2005 | Corston-Oliver et al. |
| 6,928,407 B2 | 8/2005 | Ponceleon et al. |
| 6,928,448 B1 | 8/2005 | Franz et al. |
| 6,937,974 B1 | 8/2005 | d'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 7,027,974 B1 * | 4/2006 | Busch et al. .............. 704/4 |
| 7,132,445 B2 | 11/2006 | Taveras et al. |
| 7,146,358 B1 | 12/2006 | Gravano et al. |
| 7,184,948 B2 | 2/2007 | Chalabi et al. |
| 7,200,550 B2 | 4/2007 | Menezes et al. |
| 7,231,393 B1 | 6/2007 | Harik et al. |
| 7,249,121 B1 | 7/2007 | Bharat et al. |
| 7,263,488 B2 | 8/2007 | Chu et al. |
| 7,272,595 B2 | 9/2007 | Tsuchitani et al. |
| 7,283,951 B2 | 10/2007 | Marchisio et al. |
| 7,383,258 B2 | 6/2008 | Harik et al. |
| 7,398,201 B2 | 7/2008 | Marchisio et al. |
| 7,403,938 B2 | 7/2008 | Harrison et al. |
| 7,406,542 B2 | 7/2008 | Erlingsson |
| 7,409,404 B2 | 8/2008 | Gates |
| 7,426,507 B1 | 9/2008 | Patterson |
| 7,444,348 B2 | 10/2008 | Fries et al. |
| 7,461,056 B2 | 12/2008 | Cao et al. |
| 7,466,334 B1 | 12/2008 | Baba et al. |
| 7,475,015 B2 | 1/2009 | Epstein et al. |
| 7,490,099 B2 | 2/2009 | Myers et al. |
| 7,536,408 B2 | 5/2009 | Patterson |
| 7,555,428 B1 | 6/2009 | Franz et al. |
| 7,577,683 B2 | 8/2009 | Cho et al. |
| 7,580,827 B1 | 8/2009 | Brants et al. |
| 7,580,921 B2 | 8/2009 | Patterson |
| 7,580,929 B2 | 8/2009 | Patterson |
| 7,584,175 B2 | 9/2009 | Patterson |
| 7,599,914 B2 | 10/2009 | Patterson |
| 7,619,656 B2 | 11/2009 | Ben-Ezra et al. |
| 7,668,791 B2 | 2/2010 | Azzam et al. |
| 7,672,830 B2 | 3/2010 | Goutte et al. |
| 7,672,831 B2 | 3/2010 | Todhunter et al. |
| 7,689,536 B1 | 3/2010 | Weissman et al. |
| 7,693,813 B1 | 4/2010 | Cao et al. |
| 7,698,259 B2 | 4/2010 | Xue |
| 7,698,266 B1 | 4/2010 | Weissman et al. |
| 7,711,679 B2 | 5/2010 | Patterson |
| 7,716,216 B1 | 5/2010 | Harik et al. |
| 7,739,102 B2 | 6/2010 | Bender |
| 7,769,579 B2 | 8/2010 | Zhao et al. |
| 7,792,783 B2 | 9/2010 | Friedlander et al. |
| 7,792,836 B2 | 9/2010 | Taswell |
| 7,831,531 B1 | 11/2010 | Baluja et al. |
| 7,840,589 B1 | 11/2010 | Holt et al. |
| 7,877,371 B1 | 1/2011 | Lerner et al. |
| 7,895,221 B2 | 2/2011 | Colledge et al. |
| 7,912,705 B2 | 3/2011 | Wasson et al. |
| 7,913,163 B1 | 3/2011 | Zunger |
| 7,917,497 B2 | 3/2011 | Harrison et al. |
| 7,925,610 B2 | 4/2011 | Elbaz et al. |
| 7,925,655 B1 | 4/2011 | Power et al. |
| 7,937,265 B1 | 5/2011 | Pasca et al. |
| 7,937,396 B1 | 5/2011 | Pasca et al. |
| 7,987,176 B2 | 7/2011 | Latzina et al. |
| 8,010,539 B2 | 8/2011 | Blair-Goldensohn et al. |
| 8,019,748 B1 | 9/2011 | Wu et al. |
| 8,024,372 B2 | 9/2011 | Harik et al. |
| 8,051,104 B2 | 11/2011 | Weissman et al. |
| 8,055,669 B1 | 11/2011 | Singhal et al. |
| 8,065,248 B1 | 11/2011 | Baluja et al. |
| 8,065,290 B2 | 11/2011 | Hogue et al. |
| 8,065,316 B1 | 11/2011 | Baker et al. |
| 8,073,865 B2 | 12/2011 | Davis et al. |
| 8,078,450 B2 * | 12/2011 | Anisimovich et al. ........ 704/9 |
| 8,086,594 B1 | 12/2011 | Cao et al. |
| 8,086,619 B2 | 12/2011 | Haahr et al. |
| 8,086,624 B1 | 12/2011 | Hubinette |
| 8,090,723 B2 | 1/2012 | Cao et al. |
| 8,108,412 B2 | 1/2012 | Patterson |
| 8,112,437 B1 | 2/2012 | Katragadda et al. |
| 8,117,223 B2 | 2/2012 | Patterson |
| 8,122,026 B1 | 2/2012 | Laroco, Jr. et al. |
| 8,145,473 B2 | 3/2012 | Anisimovich et al. |
| 8,166,021 B1 | 4/2012 | Cao et al. |
| 8,176,048 B2 | 5/2012 | Morgan et al. |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,260,049 B2 | 9/2012 | Deryagin et al. |
| 8,266,077 B2 | 9/2012 | Handley |
| 8,271,453 B1 | 9/2012 | Pasca et al. |
| 8,285,728 B1 | 10/2012 | Rubin |
| 8,300,949 B2 | 10/2012 | Xu |
| 8,301,633 B2 | 10/2012 | Cheslow |
| 8,370,128 B2 | 2/2013 | Brun et al. |
| 8,402,036 B2 | 3/2013 | Blair-Goldensohn et al. |
| 8,423,495 B1 | 4/2013 | Komissarchik et al. |
| 8,468,153 B2 | 6/2013 | Ahlberg et al. |
| 8,495,042 B2 | 7/2013 | Symington et al. |
| 8,533,188 B2 | 9/2013 | Yan et al. |
| 8,548,951 B2 | 10/2013 | Solmer et al. |
| 8,554,558 B2 | 10/2013 | McCarley et al. |
| 8,577,907 B1 | 11/2013 | Singhal et al. |
| 8,856,096 B2 | 10/2014 | Marchisio et al. |
| 8,856,163 B2 | 10/2014 | Tong et al. |
| 2001/0029442 A1 | 10/2001 | Shiotsu et al. |
| 2001/0056352 A1 * | 12/2001 | Xun .................. 704/277 |
| 2002/0022956 A1 * | 2/2002 | Ukrainczyk et al. .......... 704/9 |
| 2002/0078091 A1 * | 6/2002 | Vu et al. .............. 707/513 |
| 2003/0040901 A1 * | 2/2003 | Wang .................. 704/4 |
| 2003/0101182 A1 | 5/2003 | Govrin et al. |

(56) References Cited

U.S. PATENT DOCUMENTS

| | | |
|---|---|---|
| 2003/0145285 A1 | 7/2003 | Miyahira et al. |
| 2003/0176999 A1 | 9/2003 | Calcagno et al. |
| 2004/0034520 A1 | 2/2004 | Langkilde-Geary et al. |
| 2004/0064438 A1 | 4/2004 | Kostoff |
| 2004/0098250 A1 | 5/2004 | Kimchi et al. |
| 2004/0261016 A1 | 12/2004 | Glass et al. |
| 2005/0065916 A1 | 3/2005 | Ge et al. |
| 2005/0108630 A1 | 5/2005 | Wasson et al. |
| 2005/0155017 A1 | 7/2005 | Berstis et al. |
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2005/0267871 A1 | 12/2005 | Marchisio et al. |
| 2006/0004563 A1* | 1/2006 | Campbell et al. ............ 704/9 |
| 2006/0106767 A1 | 5/2006 | Adcock et al. |
| 2006/0106793 A1 | 5/2006 | Liang |
| 2006/0149739 A1 | 7/2006 | Myers |
| 2006/0184516 A1 | 8/2006 | Ellis |
| 2007/0083505 A1 | 4/2007 | Ferrari et al. |
| 2007/0094006 A1 | 4/2007 | Todhunter et al. |
| 2007/0130112 A1 | 6/2007 | Lin |
| 2007/0143322 A1* | 6/2007 | Kothari et al. ............ 707/101 |
| 2007/0150800 A1 | 6/2007 | Betz et al. |
| 2007/0156669 A1 | 7/2007 | Marchisio et al. |
| 2007/0185860 A1 | 8/2007 | Lissack |
| 2007/0203688 A1 | 8/2007 | Fuji et al. |
| 2007/0244690 A1* | 10/2007 | Peters ............................ 704/8 |
| 2007/0250305 A1 | 10/2007 | Maxwell |
| 2007/0294200 A1* | 12/2007 | Au .............................. 706/55 |
| 2008/0091405 A1* | 4/2008 | Anisimovich et al. ........ 704/4 |
| 2008/0133218 A1 | 6/2008 | Zhou et al. |
| 2008/0133483 A1 | 6/2008 | Bayley et al. |
| 2008/0133505 A1 | 6/2008 | Bayley et al. |
| 2008/0228464 A1 | 9/2008 | Al-Onaizan et al. |
| 2008/0243777 A1 | 10/2008 | Stewart et al. |
| 2008/0294622 A1 | 11/2008 | Kanigsberg et al. |
| 2008/0319947 A1 | 12/2008 | Latzina et al. |
| 2009/0049040 A1 | 2/2009 | Fay et al. |
| 2009/0063472 A1 | 3/2009 | Pell et al. |
| 2009/0070094 A1 | 3/2009 | Best et al. |
| 2009/0076839 A1 | 3/2009 | Abraham-Fuchs et al. |
| 2009/0089047 A1 | 4/2009 | Pell et al. |
| 2009/0089277 A1 | 4/2009 | Cheslow |
| 2009/0112841 A1 | 4/2009 | Devarakonda et al. |
| 2009/0182738 A1 | 7/2009 | Marchisio et al. |
| 2009/0222441 A1 | 9/2009 | Broder et al. |
| 2009/0271179 A1 | 10/2009 | Marchisio et al. |
| 2010/0082324 A1 | 4/2010 | Itagaki et al. |
| 2010/0095196 A1 | 4/2010 | Grabarnik et al. |
| 2010/0169314 A1 | 7/2010 | Green et al. |
| 2010/0169337 A1 | 7/2010 | Green et al. |
| 2010/0318423 A1 | 12/2010 | Kanigsberg et al. |
| 2010/0332493 A1 | 12/2010 | Haas et al. |
| 2011/0040772 A1 | 2/2011 | Sheu |
| 2011/0055188 A1 | 3/2011 | Gras |
| 2011/0072021 A1 | 3/2011 | Lu et al. |
| 2011/0119254 A1 | 5/2011 | Brown et al. |
| 2011/0153539 A1 | 6/2011 | Rojahn |
| 2011/0191286 A1 | 8/2011 | Cho et al. |
| 2011/0202526 A1 | 8/2011 | Lee et al. |
| 2011/0202563 A1 | 8/2011 | Colledge et al. |
| 2011/0258181 A1 | 10/2011 | Brdiczka et al. |
| 2011/0295864 A1 | 12/2011 | Betz et al. |
| 2011/0301941 A1 | 12/2011 | De Vocht |
| 2011/0307435 A1 | 12/2011 | Overell et al. |
| 2011/0314032 A1 | 12/2011 | Bennett et al. |
| 2012/0023104 A1 | 1/2012 | Johnson et al. |
| 2012/0030226 A1 | 2/2012 | Holt et al. |
| 2012/0047145 A1 | 2/2012 | Heidasch |
| 2012/0131060 A1 | 5/2012 | Heidasch et al. |
| 2012/0197628 A1 | 8/2012 | Best et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0271627 A1* | 10/2012 | Danielyan et al. ............ 704/9 |
| 2012/0296897 A1 | 11/2012 | Xin-Jing et al. |
| 2012/0310627 A1 | 12/2012 | Qi et al. |
| 2013/0013291 A1 | 1/2013 | Bullock et al. |
| 2013/0041652 A1* | 2/2013 | Zuev et al. .................. 704/8 |
| 2013/0054589 A1 | 2/2013 | Cheslow |
| 2013/0091113 A1 | 4/2013 | Gras |
| 2013/0132383 A1 | 5/2013 | Ahlberg et al. |
| 2013/0138696 A1 | 5/2013 | Turdakov et al. |
| 2013/0144592 A1 | 6/2013 | Och et al. |
| 2013/0144594 A1 | 6/2013 | Bangalore et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | MOORE et al. |
| 2013/0318095 A1 | 11/2013 | Harold |
| 2014/0012842 A1 | 1/2014 | Yan et al. |

OTHER PUBLICATIONS

Hutchins, Machine Translation: Past, Present, Future, Ellis Horwood, Ltd., Chichester, UK, 1986.

Mitamura, T. et al. "An Efficient Interlingua Translation System for Multi-lingual Document Production," Proceedings of Machine Translation Summit III, Washington DC, Jul. 2-4, 1991.

* cited by examiner

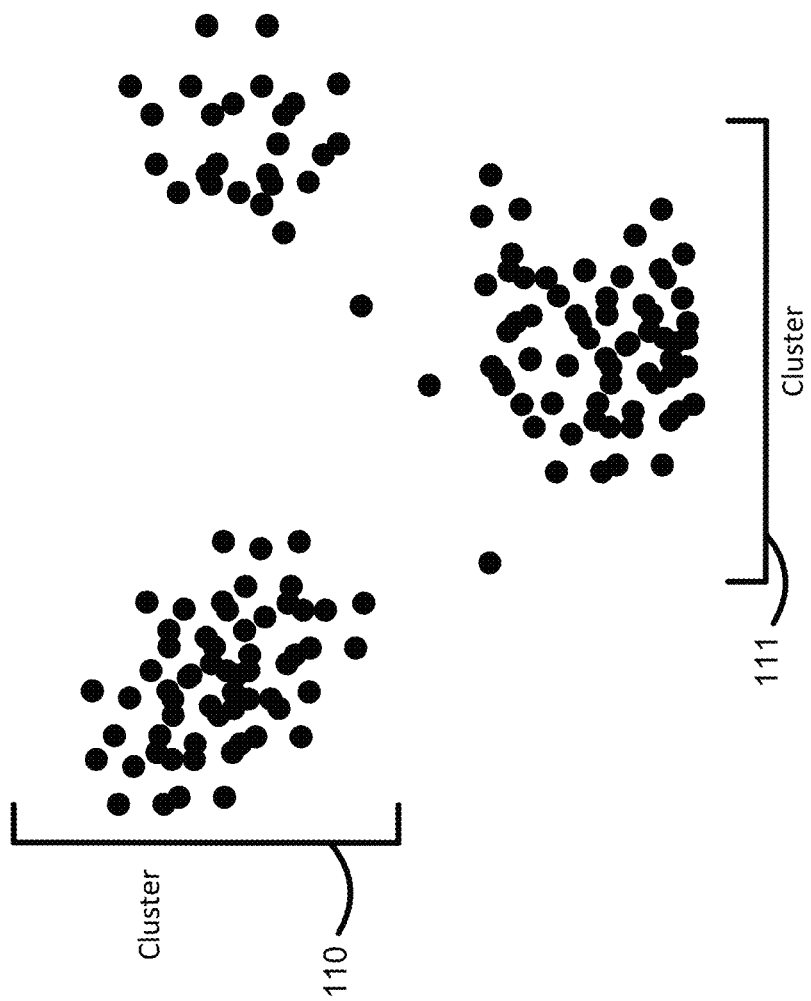

CROSS-LANGUAGE TEXT CLUSTERING

CROSS-REFERENCE TO RELATED APPLICATIONS

For purposes of the USPTO extra-statutory requirements, the present application constitutes a continuation-in-part of U.S. patent application Ser. No. 12/983,220, filed on 31 Dec. 2010, which is a continuation-in-part of U.S. Ser. No. 11/548,214, filed on 10 Oct. 2006, which is currently co-pending, or is an application of which a currently co-pending application is entitled to the benefit of the filing date. This application is also a continuation-in-part of U.S. patent application Ser. No. 13/535,638, filed 28 Jun. 2012.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but points out that the designations are not to be construed as commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

All subject matter of the Related Application(s) and of any and all parent, grandparent, great-grandparent, etc. applications of the Related Applications is incorporated herein by reference to the extent such subject matter is not inconsistent herewith.

BACKGROUND OF THE INVENTION

1. Field

Implementations of the present invention relate to natural language processing. In particular, implementations relate to classifying, and also to clustering and filtering of text-centric documents written in one or more languages.

2. Description of the Related Art

The modern man has to deal every day with huge volume of new information. Also, corporations, agencies and libraries must receive and process a lot of text and text resources. Information is presented in many forms including texts, resources and references, print (e.g., newspapers and magazines), Internet sources (e.g., videos, audio programs), etc. Selection, cataloguing and filtering of information is an important task in managing information overload. Sometimes texts must be selected based on some feature or a plurality of a tightly defined set of features. Other times there is a need to find texts that are similar to a given text. Yet other times, there is a need to form groups or classes of texts according to a set of criteria. Text-based information which a person or organization must use may originate from many countries and may be written in different languages. Known mathematical methods of classifying and clustering objects that have been adopted for solving these tasks are insufficient to adequately cope with information overload.

Many natural language processing systems involve classifying texts into predefined categories. For example, in order to sort the huge amount of news available online into some meaningful categories, e.g., politics, cultural events, sporting events, etc., a text classification method may be applied. Other tasks related to text processing include clustering and filtering.

Nowadays, there is a great desire to be able to analyze multi-language data. However, existing text processing systems are usually language-dependent, i.e., they are able to analyze text written only in one particular language and cannot readily be ported to address another language.

The very few existing cross-language systems are based on machine translation techniques. These systems generally choose a so called target language, translate all documents to that language with machine translation techniques, and then construct document representations and apply classification. Such machine translation creates additional errors not found in the source material and, moreover, the analysis is usually based on low-level properties of documents, and the meanings of documents are not reflected in the utilized representation or translation.

Thus, it is possible to create systems that can improve cross-language document processing, including classification, clustering and filtering, systems that can take into account not only the symbolic information found in sources, but systems that address semantics, i.e., meaning, of documents.

SUMMARY

Methods are described for performing clustering or classification of texts of different languages. Language-independent semantic structures (LISS) are constructed before clustering is performed. These structures reflect lexical, morphological, syntactic, and semantic properties of texts. The methods suggested are able to perform cross-language text clustering which is based on the meaning derived from texts. The methods are applicable to genre classification, topic detection, news analysis, authorship analysis, internet searches, and creating corpora for other tasks, etc.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 1A illustrates an output from the process of clustering according to one or more embodiments of the invention.

DETAILED DESCRIPTION

Figure 1:
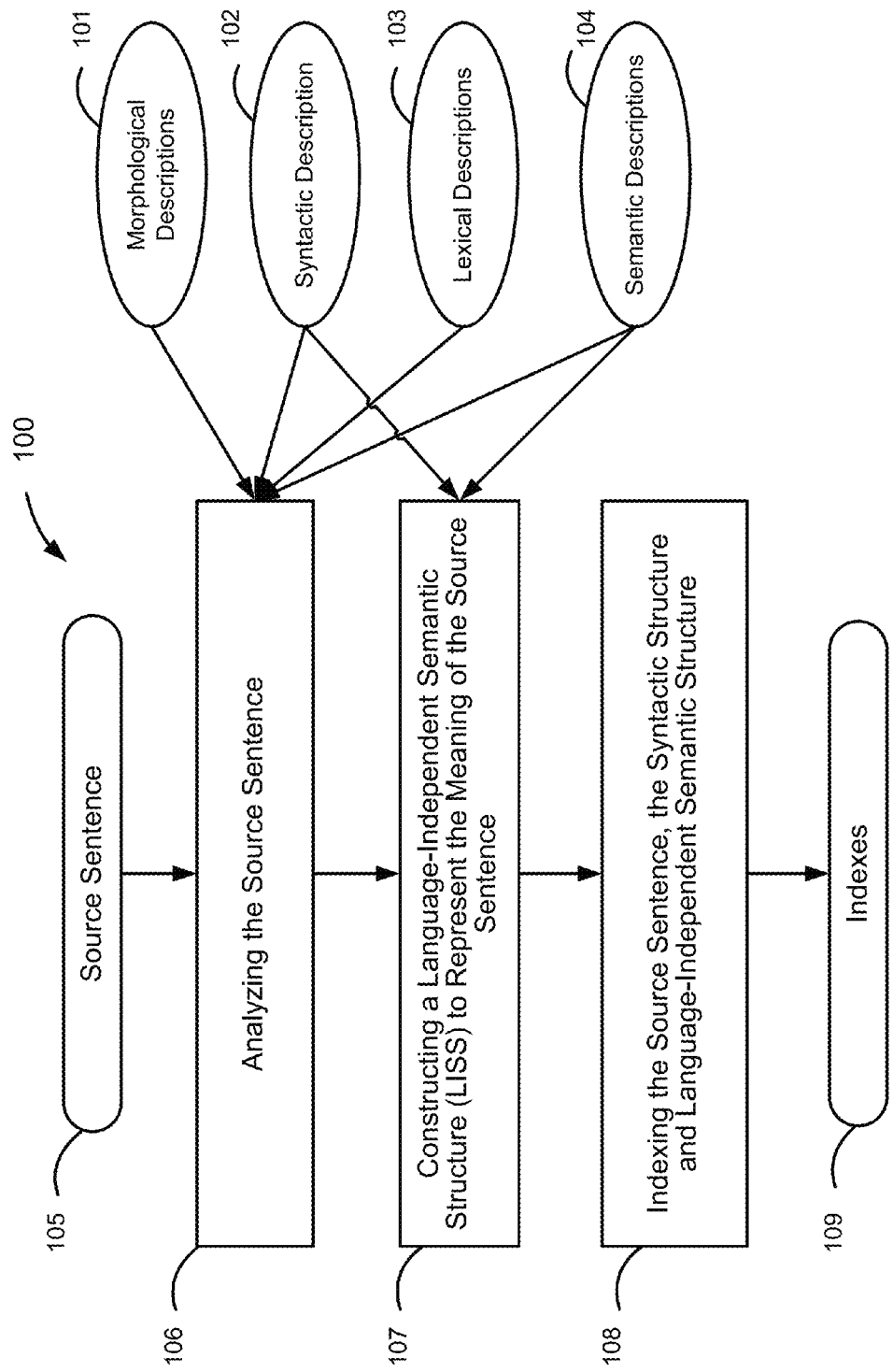
FIG. 1 is a flow diagram of a method according to one or more embodiments of the invention.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not other embodiments.

Implementations of the present invention disclose techniques for cross-language natural language text processing such as text classification, clustering and filtering based on exhaustive syntactic and semantic analyses of texts and language-independent semantic structures. A lot of lexical, grammatical, syntactical, pragmatic, semantic and other features of the texts may be identified, extracted and effectively used to solve said tasks.

A classifier is an instrument to perform classification. One implementation of document classification may be formulated as follows: given a finite set of categories $\{C_1, C_2, \ldots, C_n\}$ and an input document D, a classifier has to assign the document D to one (or more) of the categories $\{C_1, C_2, \ldots, C_n\}$ or produce an output representing a set of pairs (a so called classification spectrum) $\{(C_1, w_1), (C_2, w_2), \ldots, (C_n, w_n)\}$, where for each integer i from 1 to n, $C_i$ is the category and $w_i$ is a weight (e.g., a real number in the interval [0,1]) defining to which extend the document D belongs to the category $C_i$. A threshold value may be defined in order to omit the categories with low weights below the threshold. For example, given the following categories {Sport, TV, Business, Art} and a document to be classified describing a TV show about football, an adequate classifier could produce the following classification spectrum for the document {(Sport, 0.7), (TV,0.8), (Business,0.2), (Art, 0.05)}. If the threshold is 0.3, only sport and TV categories will be considered.

Classification is a task of supervised learning, i.e., supervised (training) data is required. Training data is a set of labeled documents, i.e., each document is labeled with its category or classification spectrum. By analyzing this labeled data, a so called classification function or classification model is defined. This function or model should predict an output (category or a classification spectrum) for an input document.

Many natural language processing (NLP) problems may be formulated as a task of classification. For example, authorship attribution is a problem of assigning authors to anonymous texts, the authors are to be chosen out of a predefined list of possible authors. For each possible author, one or more documents written by the author are available. Thus, these documents are the training data and a classifier may be trained in order to assign an author to the anonymous texts. Another problem formulated as a task of classification is determining a document's genre or topic(s) out of lists of possible genres and topics when training data are available for each genre or topic.

Classification is usually performed on documents represented as vectors of so called features. Features represent characteristics of the documents to be classified and should reflect essential characteristics for the particular task. The naïve approach is to create features out of words: each word in a document may be a feature, thus vectors containing frequencies of each word may be utilized in classification. Another common way to create this vector space model is term frequency—inverted document frequency (TF-IDF) document representation (such as described by Salton, 1988), in this approach a value in a document vector is not only proportional to the corresponding word frequency in the document but is also inversely proportional to its frequency in the entire document corpus. Thus, those words that are frequently found in documents (e.g., and, but, the, a, etc.) do not get high values.

Another task of processing huge collections of texts is clustering. Clustering is the task of attributing or sorting objects into groups (clusters) so that objects in the same cluster are more similar to each other than to those in other clusters. The clusters may be presented as conglomerations of points in n-dimensional space, where n is the number of features which are used for attributing. FIG. 1A is an illustration for the task of clustering. The criteria of attributing may be very different from each other.

As distinct from classifying, clustering may executed without training, without samples, representing groups. Clustering is one of the tasks traditionally associated with data mining, and common techniques for statistical data analysis may be used to indicate similar objects.

The task of clustering can be solved by various algorithms that differ significantly in their notion of what constitutes a cluster and how to efficiently find them. The most general way of searching clusters is to find groups with low "distances" among or between the cluster members, dense areas of the data space, intervals or particular statistical distributions. The proper algorithm of clustering and selection of parameters (including distance function, a density threshold or the number of expected clusters) depend on the individual data set and the goal or goals of clustering. In case of texts, there is a wide diapason of features which can be used for this purpose.

In practice, the task of clustering across languages usually is an iterative process of knowledge discovery and interactive multi-objective optimization. It will often be necessary to modify preprocessing and parameters, and modify the selection of features until the results exhibit the desired properties.

Still another task of cross-language processing huge collections of texts is filtering. It consists of selecting texts by one or more criteria. The simple examples of such task may be filtering by author, by title, by topic, by word or group of words, by date of issue or source, by geographical source, etc. A more complex tasks of filtering may be formulated on the basis of using deeper properties of texts, the properties related to their lexical, syntactic and semantic features of the texts. For example, tasks related to sentiment analysis may consist in a selection of documents that reflect a specific attitude of an author to a subject. It can be expressed in different ways, for example, by lexical means, but it is difficult to say a priori which words might be used by authors. On the other hand, filtering allows one to avoid results where documents exhibit some chosen criteria.

Some widely used features that can be used are primarily lexical and character features, those that consider a text as a sequence of words and characters respectively. Namely, word frequencies, n-grams, letter frequencies, character n-grams, etc. A big advantage of these features is that they are easy to be extracted automatically. But they are language dependent and do not capture a document's semantics. Therefore, these lexical-based features do not allow performing cross-language, semantically rich, document analysis.

Language independent features of a text capture not only the symbolic information but semantics of a text often appear to be more promising for solving various tasks. For example, certain tasks associated within authorship analysis systems are promising since many authors write in different languages or their texts are translated. A language independent system could fairly compare authors across different languages. Features of the original author can be lost in translation. Language independent systems should capture an author's writing style when an author's work is translated. Language independent systems would also be highly useful to group online news by topic across languages, since there is a big amount of news written in different languages, and increasingly news can be accessed easily in text and other formats through the Internet.

Previous cross-language systems do not provide accurate extraction of language independent semantically rich features of text. Therefore these systems were not exploited or adopted. Existing systems for text document processing are limited to analyzing documents written in a single language, and systems that attempt to process across languages fail to address or analyze semantically rich features of text. However, for some tasks such as topic detection in online news or authorship attribution of translated texts, cross-language analysis techniques are required. The existing systems dealing with documents written in different languages usually translate them to one particular language (e.g., English, Russian, Mandarin) with machine translating systems and then apply classification. Therefore syntactic and semantic properties of the source sentences are not taken into account.

Advantageously, the problems associated with existing text processing systems are overcome—or at least reduced—by the techniques and systems disclosed herein.

Implementations of the invention allow a user to perform classification, clustering and filtering of natural language texts written in one or many natural languages. The techniques are particularly effective for searching across many natural languages. The disclosed methods take into account lexical, grammatical, syntactical, pragmatic, semantic and other features of texts.

The features are extracted during an exhaustive analysis of each sentence and constructing language-independent semantic structures. Such exhaustive analysis precedes classification, clustering and/or filtering texts. The system employs automatic syntactic and semantic analyses to determine and to extract lexical, grammatical, syntactical, pragmatic, semantic and other features for their further using in processing texts. Then, the system indexes based on the extracted information, and stores syntactic and semantic information about each sentence, as well as parses results and lexical choices including results obtained when resolving ambiguities. The system analyzes sentences using linguistic descriptions of a given natural language to reflect the real complexities of the natural language, rather than simplified or artificial descriptions. The system functions based on the principle of integral and purpose-driven recognition, where hypotheses about the syntactic structure of a part of a sentence are verified within the hypotheses about the syntactic structure of the whole sentence. It avoids analyzing numerous parsing of anomalous variants.

FIG. 1 is a flow diagram 100 of a method of exhaustive analysis according to one or more embodiments of the invention. With reference to FIG. 1, linguistic descriptions may include lexical descriptions 101, morphological descriptions 102, syntactic descriptions 103, and semantic descriptions 104. Each of these components of linguistic descriptions are shown influencing or serving as input to steps in the flow diagram 100. The method includes starting from a source sentence 105. The source sentence is analyzed 106. Next, a language-independent semantic structure (LISS) is constructed 107. The LISS represents the meaning of the source sentence. Next, the source sentence, the syntactic structure of the source sentence and the LISS are indexed 108. The result is a set of collection of indexes or indices 109.

An index usually comprises and may be represented as a table where each value of a feature (for example, a word, expression, or phrase) in a document is accompanied by a list of numbers or addresses of its occurrence in that document. According to embodiments of the present invention, morphological, syntactic, lexical, and semantic features can be indexed in the same fashion as each word in a document is indexed. In one embodiment of the present invention, indexes may be produced to index all or at least one value of morphological, syntactic, lexical, and semantic features (parameters). These parameters or values are generated during a two-stage semantic analysis described in more detail below. The index may be used to facilitate such operations of natural language processing such as semantic searching, classifying, clustering and filtering of cross-language documents. As used herein, cross-language documents include those documents that address a common topic and that are in different languages.

In one implementation, said linguistic descriptions include a plurality of linguistic models and knowledge about natural languages. These may be arranged in a database and applied for analyzing each text or source sentence such as at step 106. Such a plurality of linguistic models may include, but are not limited to, morphology models, syntax models, grammar models and lexical-semantic models. In a particular implementation, integral models for describing the syntax and semantics of a language are used in order to recognize the meanings of the source sentence, analyze complex language structures, and correctly convey information encoded in the source sentence.

Figure 2:
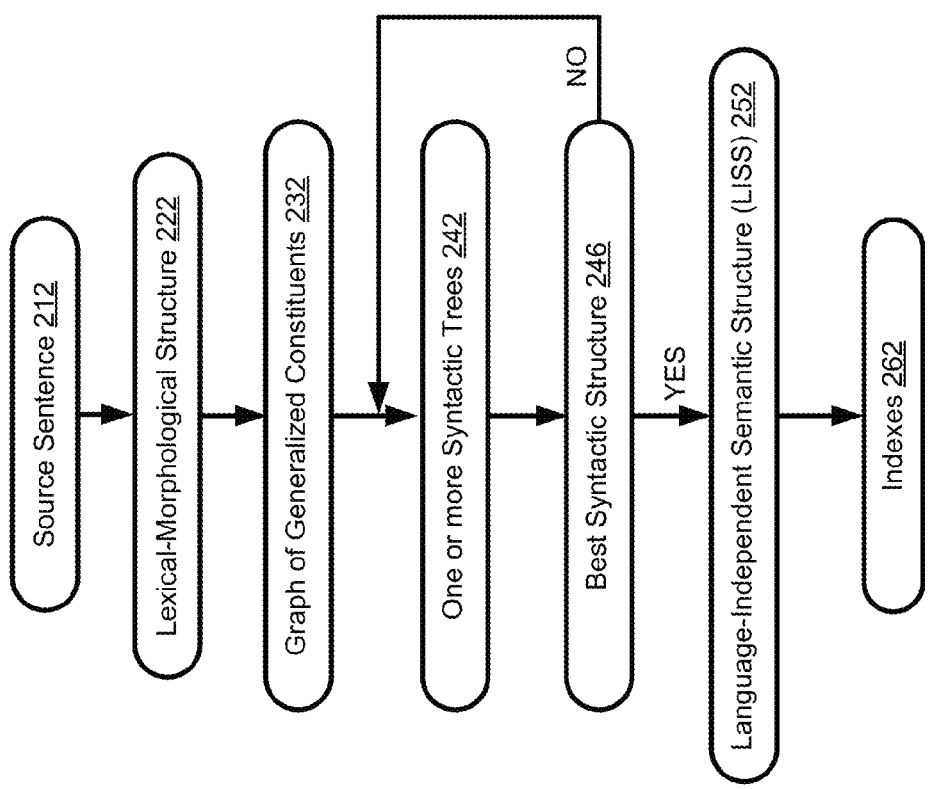
FIG. 2 shows a flow diagram of the method in detail according to one or more embodiments of the invention.

FIG. 2 shows a flow diagram of the method according to one or more embodiments of the invention in detail. With reference to FIG. 1 and FIG. 2, when analyzing 106 the meaning of the source sentence 105, a lexical-morphological structure is found 222. Next, a syntactic analysis is performed and is realized in a two-step analysis algorithm (e.g., a "rough" syntactic analysis and a "precise" syntactic analysis) implemented to make use of linguistic models and knowledge at various levels, to calculate probability ratings and to generate the most probable syntactic structure, e.g., a best syntactic structure.

Figure 2A:
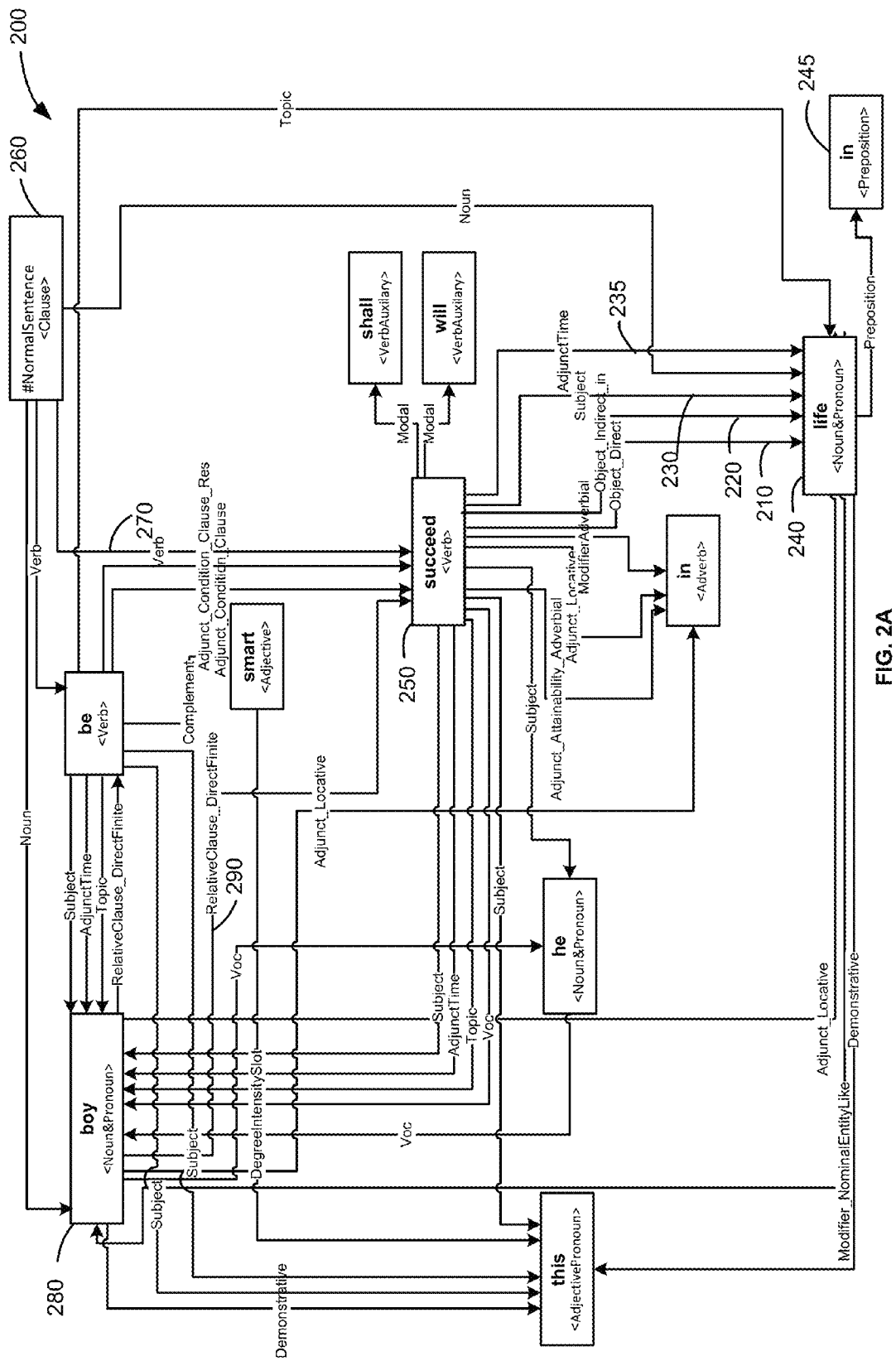
FIG. 2A illustrates a graph of generalized constituents of an exemplary sentence according to one exemplary embodiment of the invention.

Accordingly, a rough syntactic analysis is performed on the source sentence to generate a graph of generalized constituents 232 for further syntactic analysis. All reasonably possible surface syntactic models for each element of lexical-morphological structure are applied, and all the possible constituents are built and generalized to represent all the possible variants of parsing the sentence syntactically. FIG. 2A illustrates a graph of generalized constituents of an exemplary sentence "This boy is smart, he'll succeed in life" according to one exemplary embodiment of the invention.

Following the rough syntactic analysis, a precise syntactic analysis is performed on the graph of generalized constituents to generate one or more syntactic trees 242 to represent the source sentence. In one implementation, generating the syntactic tree 242 comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated or arranged in order of decreasing assessment. Thus, the best syntactic tree may be generated first. Non-tree links are also checked and generated for each syntactic tree at this time. If the first generated syntactic tree fails, for example, because of an impossibility to establish non-tree links, the second syntactic tree is taken as the best, etc.

Many lexical, grammatical, syntactical, pragmatic, semantic features are extracted during the steps of these steps of analysis. For example, the system can extract and store lexical information and information about belonging lexical items to semantic classes, information about grammatical forms and linear order, about syntactic relations and surface slots, using predefined forms, aspects, sentiment features such as positive-negative relations, deep slots, non-tree links, semantemes, etc.

Figure 3:
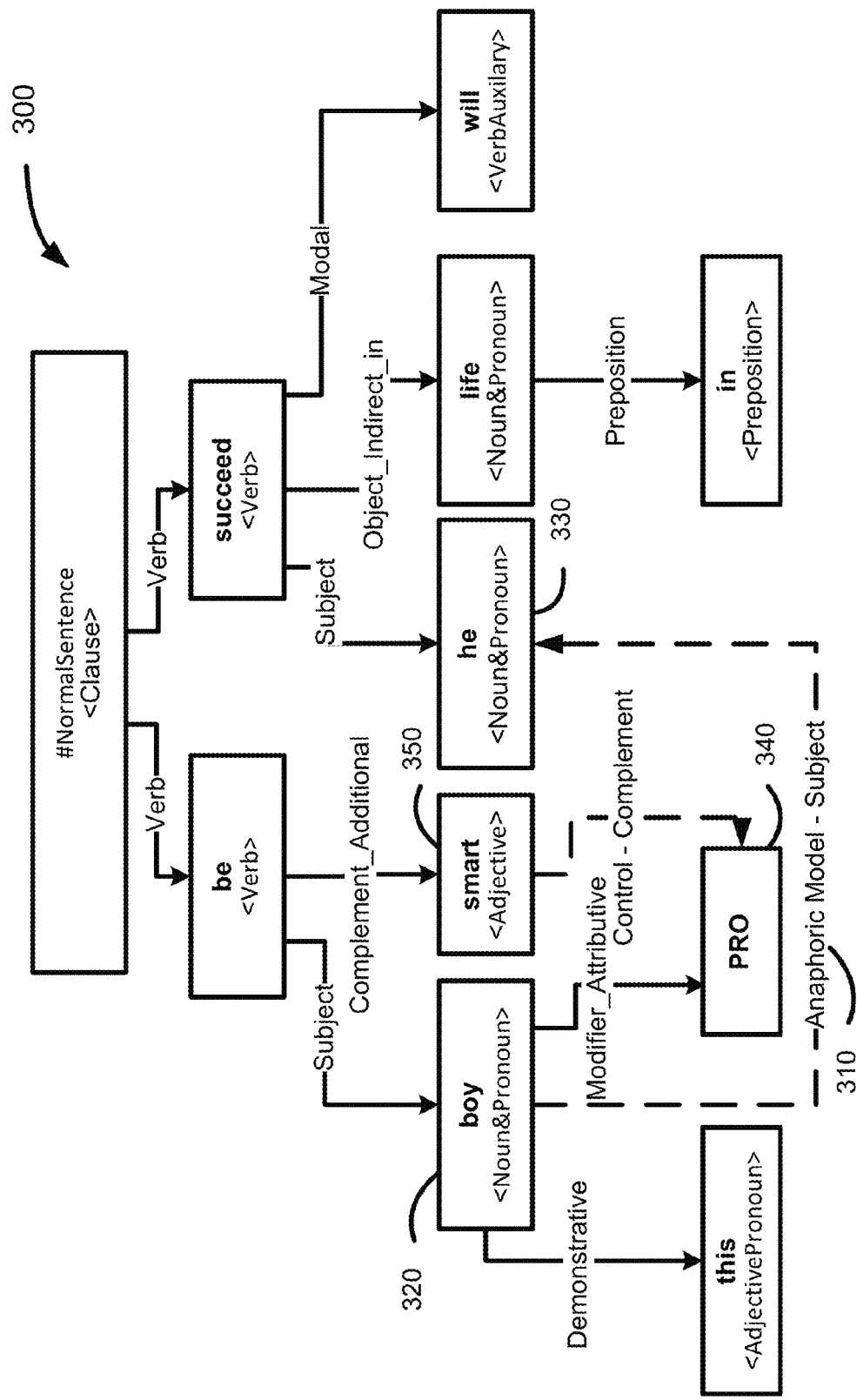
FIG. 3 shows an example of a syntactic tree, obtained as a result of a precise syntactic analysis of the exemplary sentence.

FIG. 3 shows an example of a syntactic tree 300, obtained as a result of a precise syntactic analysis of the sentence, "This boy is smart, he'll succeed in life." This tree contains complete or substantially complete syntactic information, such as lexical meanings, parts of speech, syntactic roles, grammatical values, syntactic relations (slots), syntactic models, non-tree link types, etc. For example, "he" is found to relate to "boy" as an anaphoric model subject 310. "Boy" is found as a subject 320 of the verb "be." "He" is found to be the subject 330 of "succeed." "Smart" is found to relate to "boy" through a "control—complement" 340. "Smart" is found to be an adjective 350.

With reference to FIG. 2, this two-step syntactic analysis approach ensures that the meaning of the source sentence is accurately represented by the best syntactic structure 246 chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid. In some situations, this approach reduces the computational resources required to process the sentence.

With reference to FIG. 1, after the sentence has been analyzed, at step 107 the syntactic structure of the sentence is semantically interpreted, and a language-independent semantic structure is constructed to represent the meaning of the sentence. The language-independent semantic structure is a generalized data structure in a language-independent form or format. Such language-independent semantic structure is generated for each sentence to accurately describe the meaning of the sentence and to reflect all or substantially all grammatical, lexical and syntactic features in language-independent terms.

Figure 4:
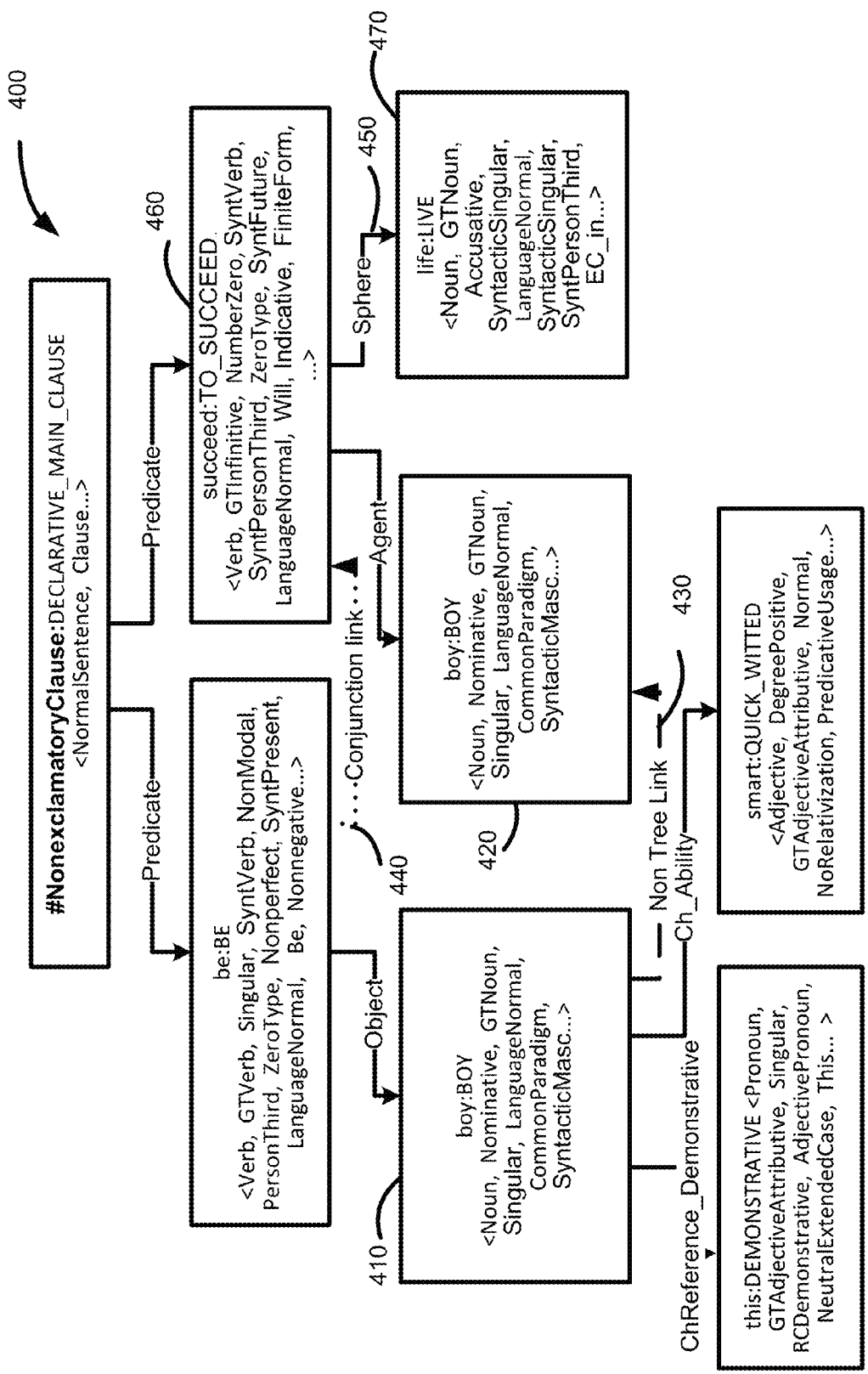
FIG. 4 shows an example of a semantic structure obtained for the exemplary sentence.
Figure 5A:
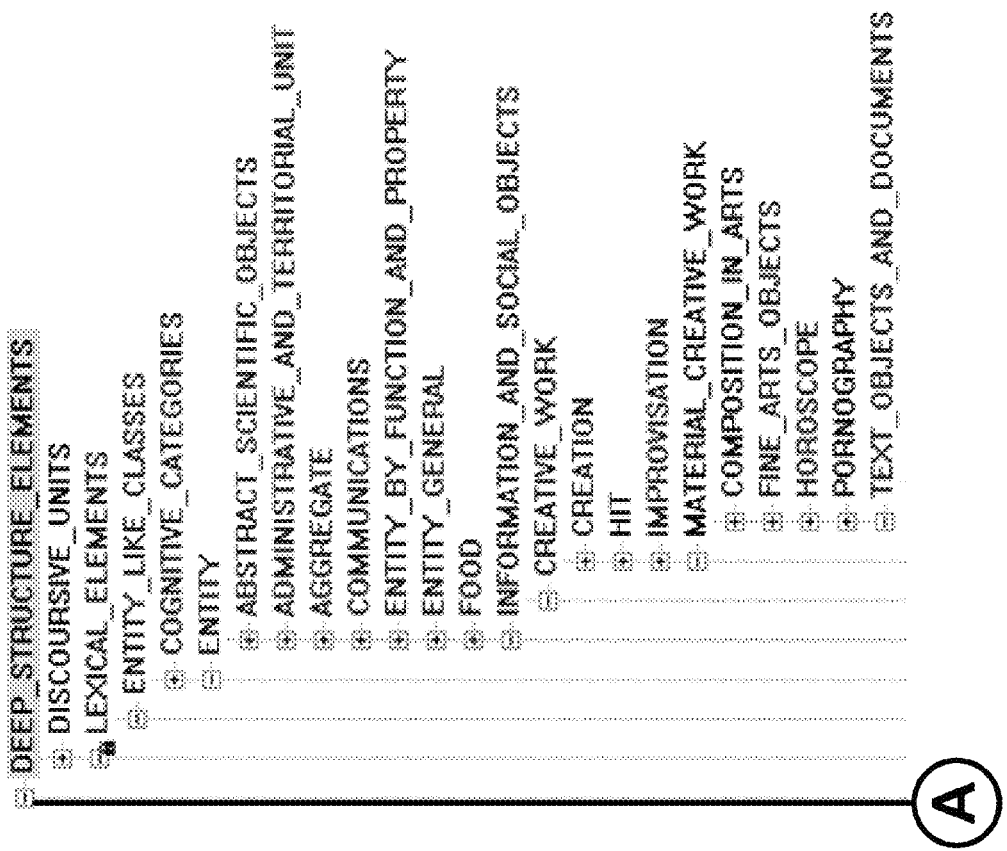
FIG. 5A-5D illustrate fragments or portions of a semantic hierarchy.
Figure 5B:
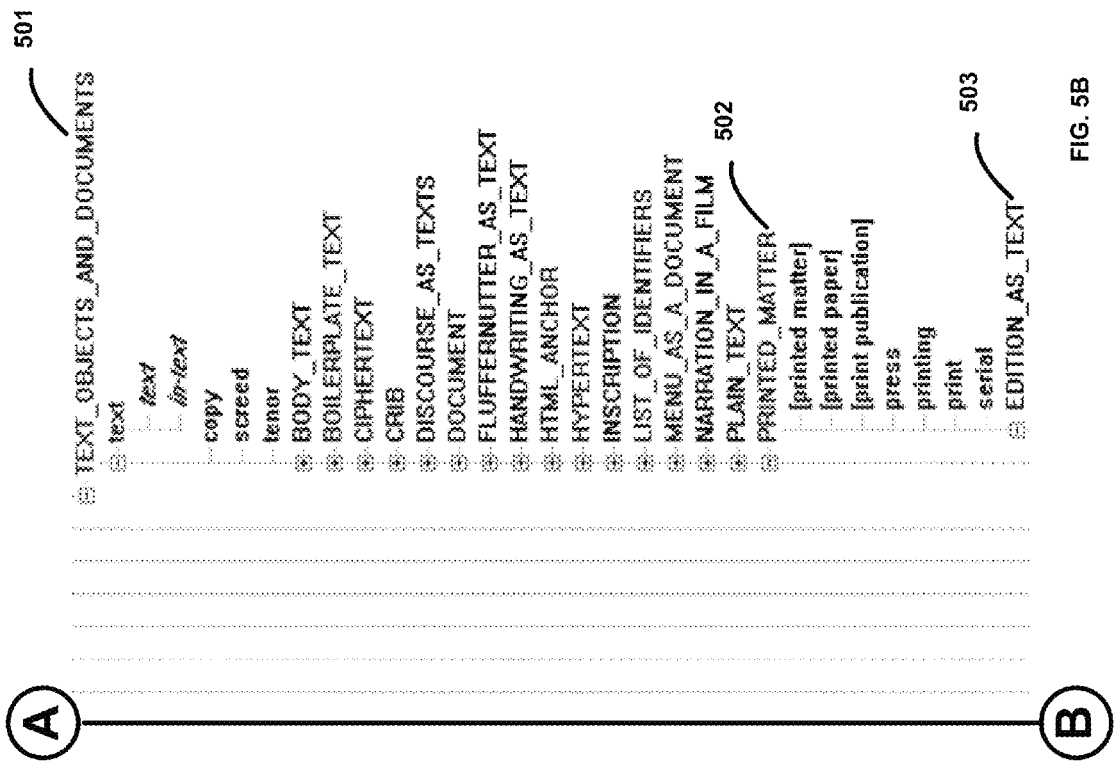
Figure 5C:
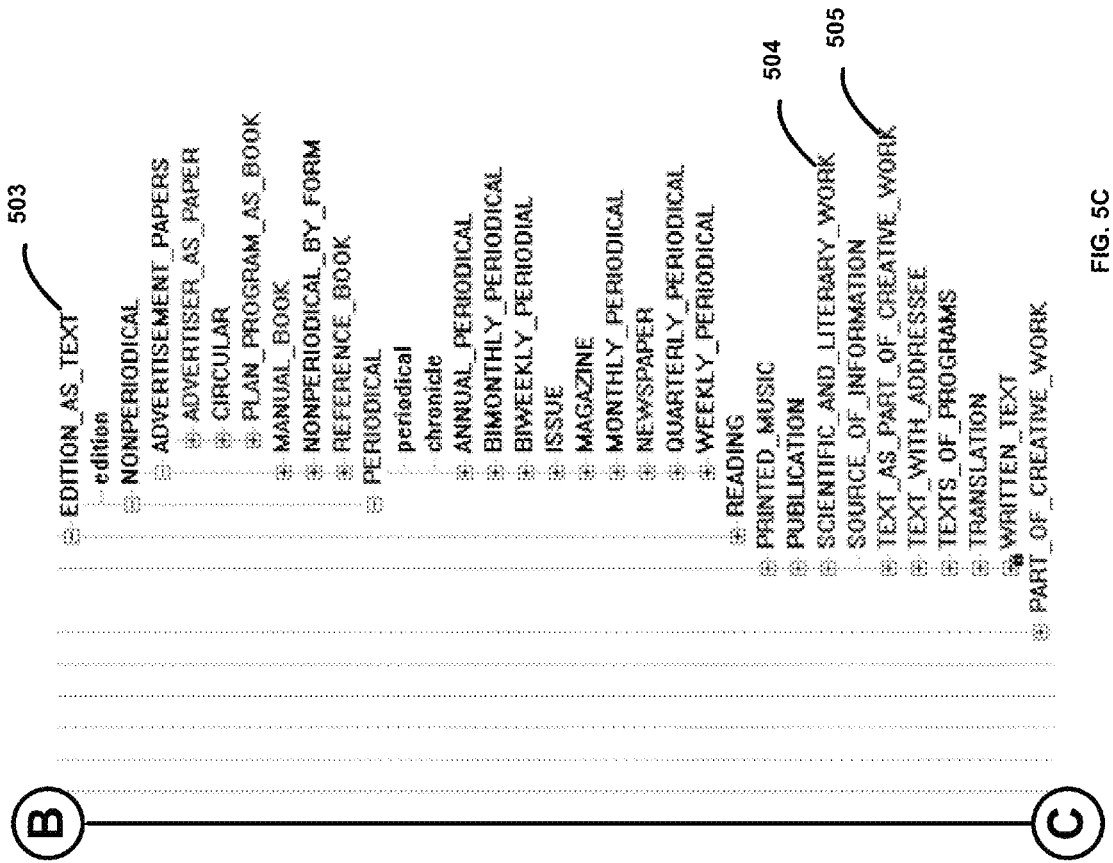
Figure 5D:
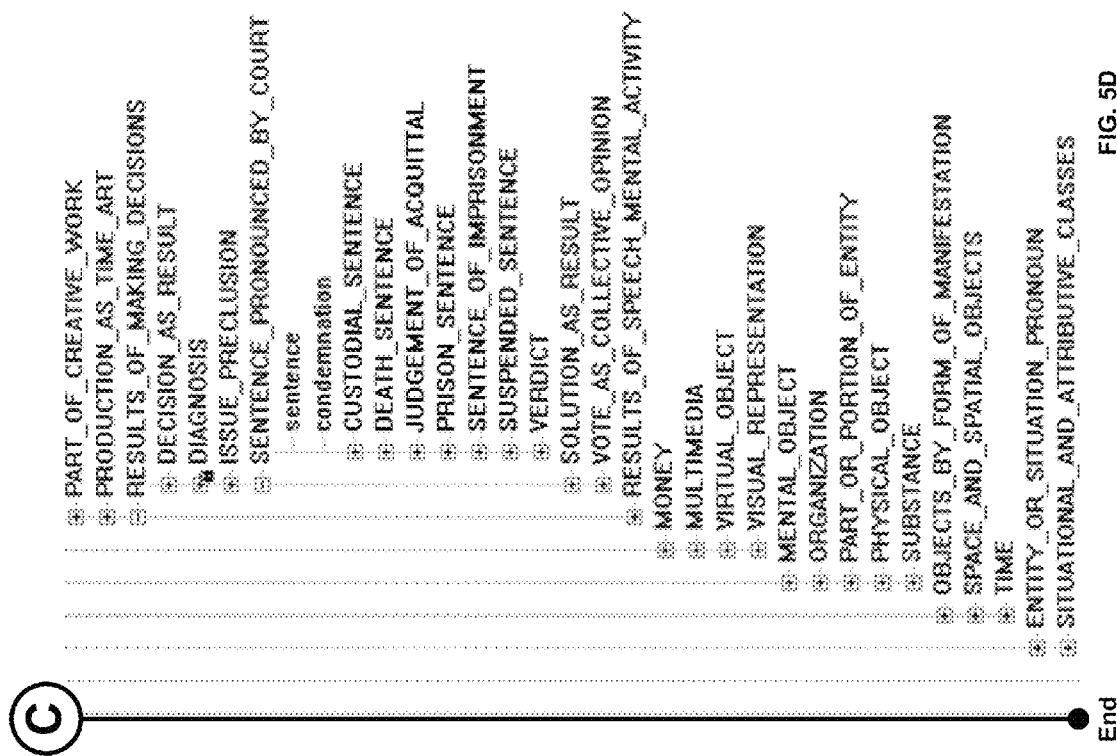

The analysis methods ensure that the maximum accuracy in conveying or understanding the meaning of the sentence is achieved. FIG. 4 shows an example of a semantic structure, obtained for the sentence "This boy is smart, he'll succeed in life." With reference to FIG. 4, this structure contains all syntactic and semantic information, such as semantic class, semantemes, semantic relations (deep slots), non-tree links, etc.

With reference to FIG. 4, the conjunction non-tree link 440 connects two parts of the complex sentence "This boy is smart, he'll succeed in life." Also, referential non-tree link 430 connects two constituents 410 and 420. This non-tree link reflects anaphoric relation between the words "boy" and "he" to identify the subjects of the two parts of the complex sentence. This relation (310) is also shown on a syntactic tree (FIG. 3) after a syntactic analysis and establishing non-tree links. Additionally, a proform PRO 340 is inserted to establish a link between the controller ("boy") 320 and the controlled element ("smart") 350. As a result, the complement "smart" 350 fills the surface slot "Modifier_Attributive" 360 of the controller "boy" 320 by means of a link of type "Control-Complement" 370.

Referring to FIG. 2, it illustrates a method to convert a source sentence 105 into a language independent semantic structure 252 through the use of various structures according to an exemplary implementation of the invention and according to linguistic descriptions employed. With reference to FIG. 2, a lexical-morphological structure 222 is found or created from a sentence (each sentence in a corpora or multi-sentence text). A graph of generalized constituents is created 232. Next, one or more syntactic trees are created 242. A best or preferred syntactic structure is selected 246. If a best one is not found, the method iterates until a best syntactic structure is identified (or until the possibilities have been exhausted). Indices of syntactic features may be generated after this step of selecting a best syntactic structure 246. Once a best syntactic structure is identified and selected 246, a language-independent semantic structure is created 252. After this step of generating a language-independent semantic structure (LISS), indices 262 of semantic features, and also, other (lexical, syntactical, morphological, pragmatic, etc.) features which had been recognized during some or all steps of analysis, may be generated.

The language-independent semantic structure (LISS) of a sentence is represented as acyclic graph (a tree supplemented with non-tree links) where each word of specific language is substituted with its universal (language-independent) semantic notions or semantic entities referred to herein as "semantic classes". Semantic class is one of the most important semantic features that can be extracted and used for tasks of classifying, clustering and filtering text documents written in one or many languages. The other features usable for such task may be semantemes, because they may reflect not only semantic, but also syntactical, grammatical, etc. language-specific features in language-independent structures.

The semantic classes, as part of linguistic descriptions, are arranged into a semantic hierarchy comprising hierarchical parent-child relationships. In general, a child semantic class inherits many or most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc.

FIG. 5A-5D illustrate fragments of said semantic hierarchy according to one embodiment of the invention. The most common notions are located in the high levels of the hierarchy. For example, as regards to types of documents, referring to FIGS. 5B and 5C, the semantic class PRINTED_MATTER (502), SCINTIFIC_AND_LITERARY_WORK(504), TEXT_AS_PART_OF_CREATIVE_ WORK (505) and others are children of the semantic class TEXT_OBJECTS_AND_DOCUMENTS (501), and in turn PRINTED_MATTER (502) is a parent for semantic classes EDITION_AS_TEXT(503) which comprises classes PERIODICAL and NONPERIODICAL, where in turn PERIODICAL is a parent for ISSUE, MAGAZINE, NEWSPAPER etc. The approach of dividing into classes may be different, The present invention takes into account first of all semantics of using the notions, which is invariant to all languages.

Each semantic class in the semantic hierarchy is supplied with a deep model. The deep model of the semantic class is a set of deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Figure 6:
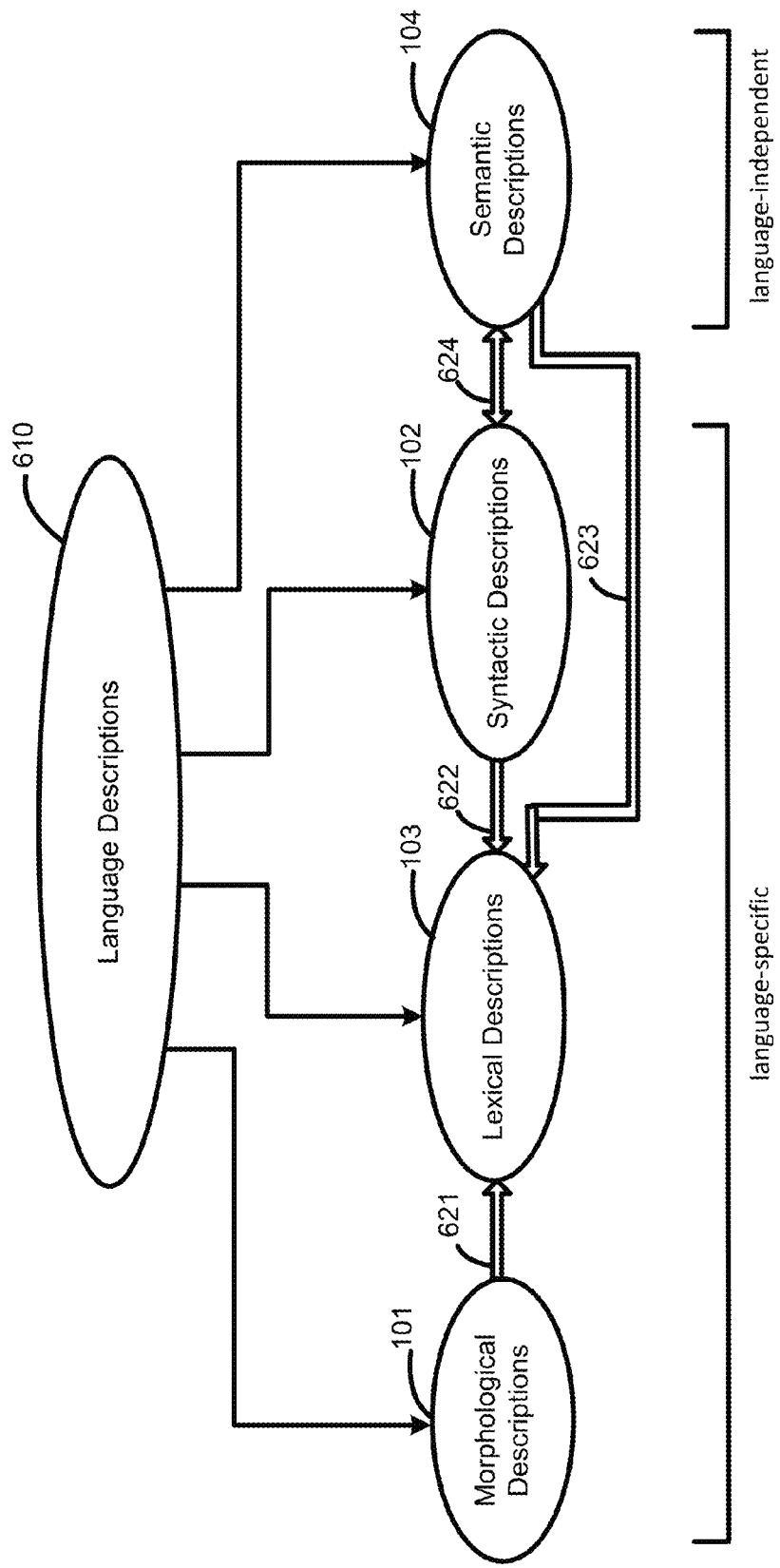
FIG. 6 is a diagram illustrating language descriptions according to one exemplary embodiment of the invention.
Figure 7:
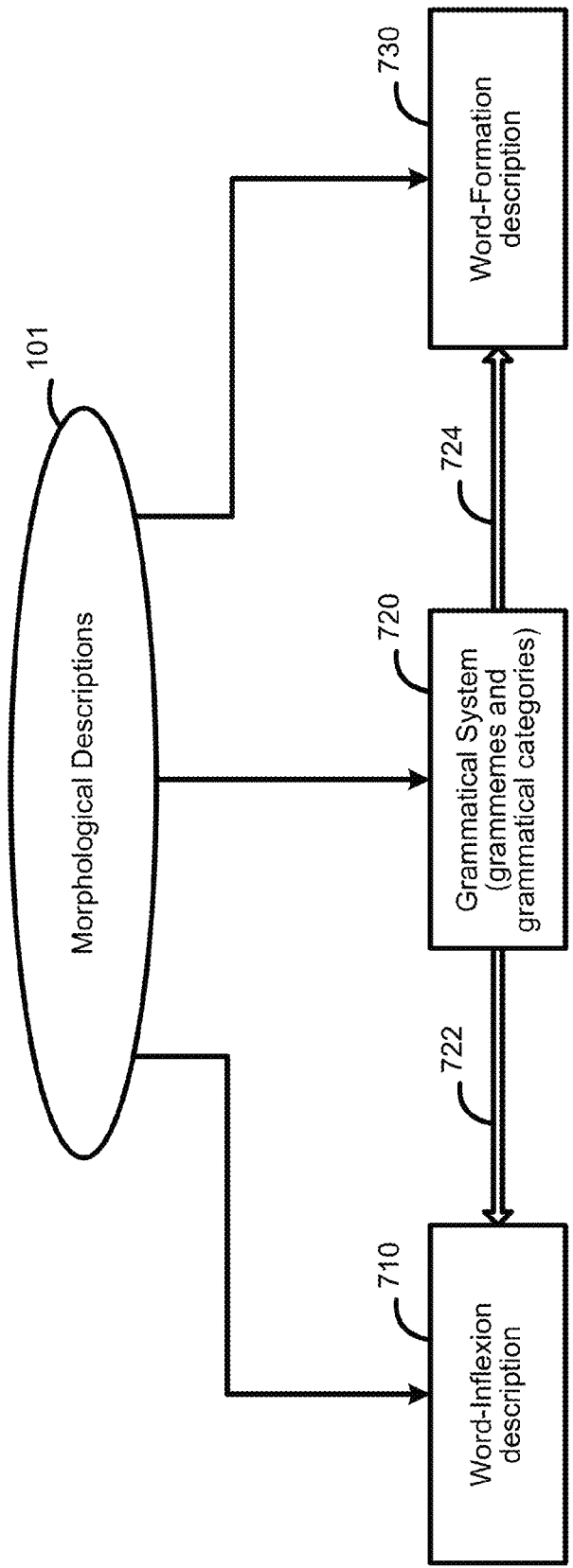
FIG. 7 is a diagram illustrating morphological descriptions according to one or more embodiments of the invention.
Figure 8:
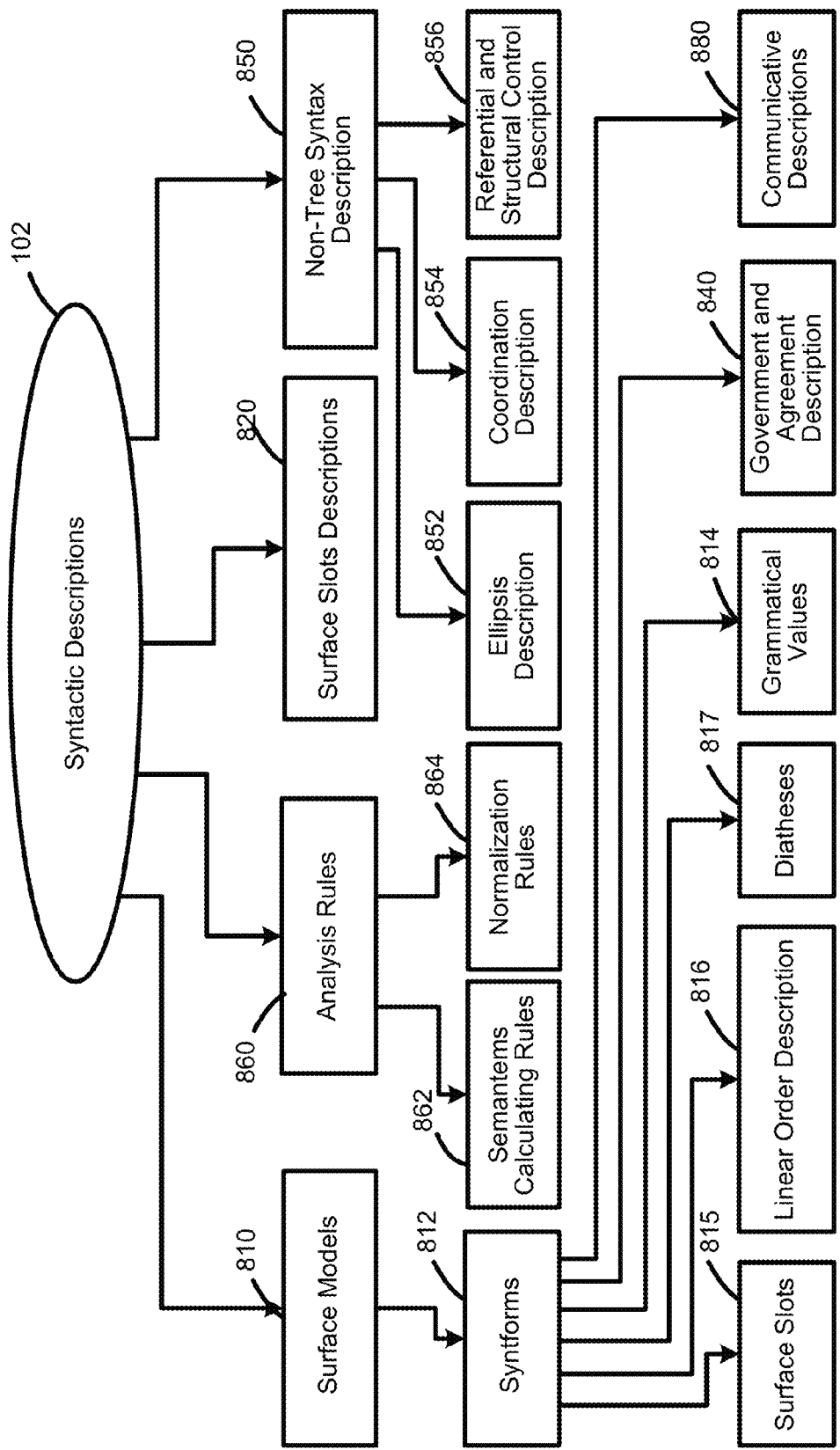
FIG. 8 is diagram illustrating syntactic descriptions according to one or more embodiments of the invention.
Figure 9:
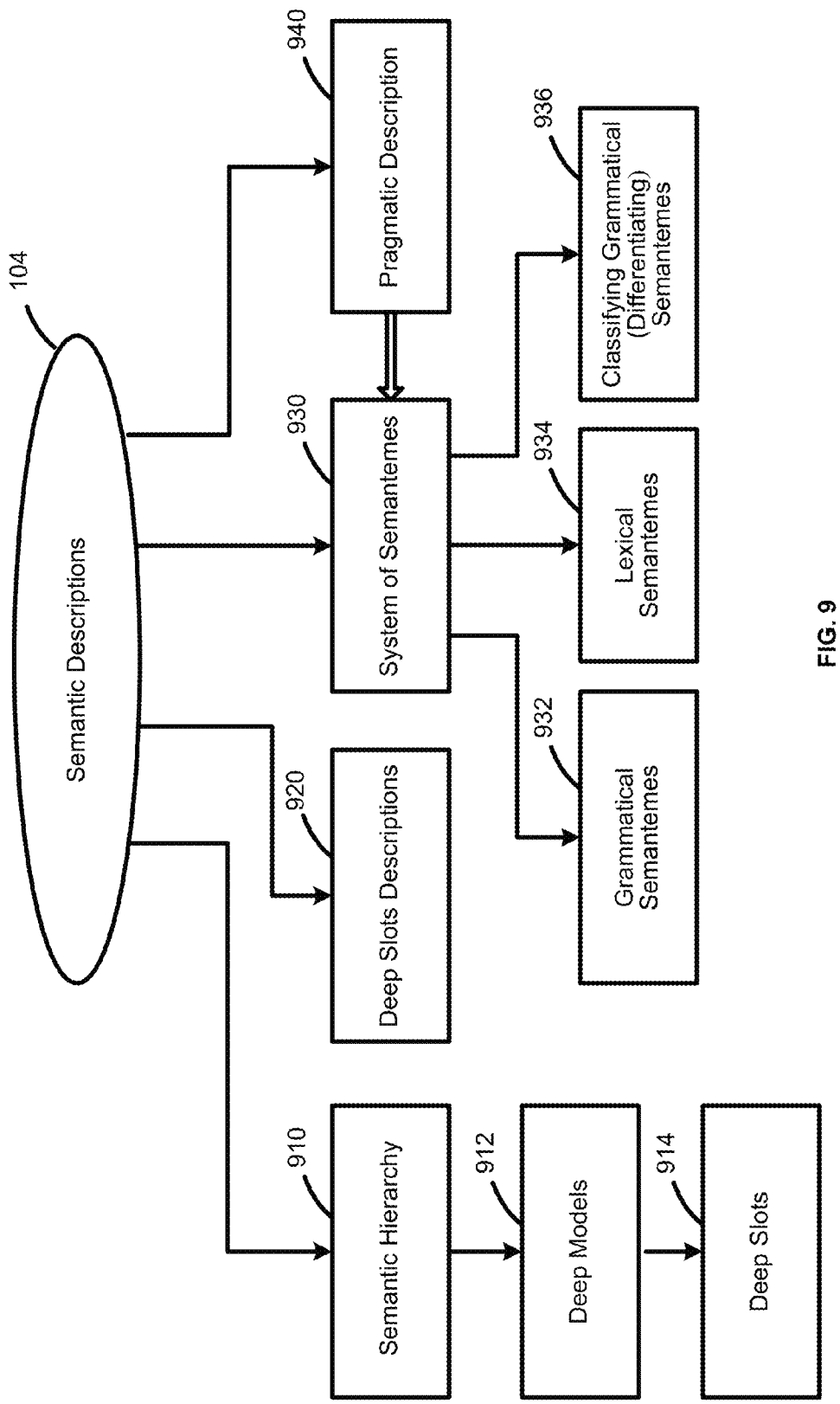
FIG. 9 is diagram illustrating semantic descriptions according to exemplary embodiment of the invention.

FIG. 6 is a diagram illustrating language descriptions 610 according to one exemplary implementation of the invention. With reference to FIG. 6, language descriptions 610 comprise morphological descriptions 101, syntactic descriptions 102, lexical descriptions, 103 and semantic descriptions 104. Language descriptions 610 are joined into one common concept. FIG. 7 is a diagram illustrating morphological descriptions according to one or more embodiments of the invention. FIG. 8 is diagram illustrating syntactic descriptions according to one or more embodiments of the invention. FIG. 9 is diagram illustrating semantic descriptions according to one or more embodiments of the invention.

With reference to FIG. 6 and FIG. 9, being a part of semantic descriptions 104, the semantic hierarchy 910 is a feature of the language descriptions 610, which links together language-independent semantic descriptions 104 and language-specific lexical descriptions 103 as shown by the double arrow 623, morphological descriptions 101, and syntactic descriptions 102 as shown by the double arrow 624. A semantic hierarchy may be created just once, and then may be filled for each specific language. Semantic class in a specific language includes lexical meanings with their models.

Semantic descriptions 104 are language-independent. Semantic descriptions 104 may provide descriptions of deep constituents, and may comprise a semantic hierarchy, deep slots descriptions, a system of semantemes, and pragmatic descriptions.

With reference to FIG. 6, the morphological descriptions 101, the lexical descriptions 103, the syntactic descriptions 102, and the semantic descriptions 104 may be related. A lexical meaning may have one or more surface (syntactic) models that may be provided by semantemes and pragmatic characteristics. The syntactic descriptions 102 and the semantic descriptions 104 are also related. For example, diatheses of the syntactic descriptions 102 can be considered as an "interface" between the language-specific surface models and language-independent deep models of the semantic description 104.

FIG. 7 illustrates exemplary morphological descriptions 101. As shown, the components of the morphological descriptions 101 include, but are not limited to, word-inflexion description 710, grammatical system (e.g., grammemes) 720, and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

With reference to FIG. 7, a word-inflexion description 710 describes how the main form of a word may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

FIG. 8 illustrates exemplary syntactic descriptions 102. With reference to FIG. 8, the components of the syntactic descriptions 102 may comprise surface models 810, surface slot descriptions 820, referential and structural control descriptions 856, government and agreement descriptions 840, non-tree syntax descriptions 850, and analysis rules 860. The syntactic descriptions 302 are used to construct possible syntactic structures of a sentence from a given source language, taking into account free linear word order, non-tree syntactic phenomena (e.g., coordination, ellipsis, etc.), referential relationships, and other considerations.

Figure 10:
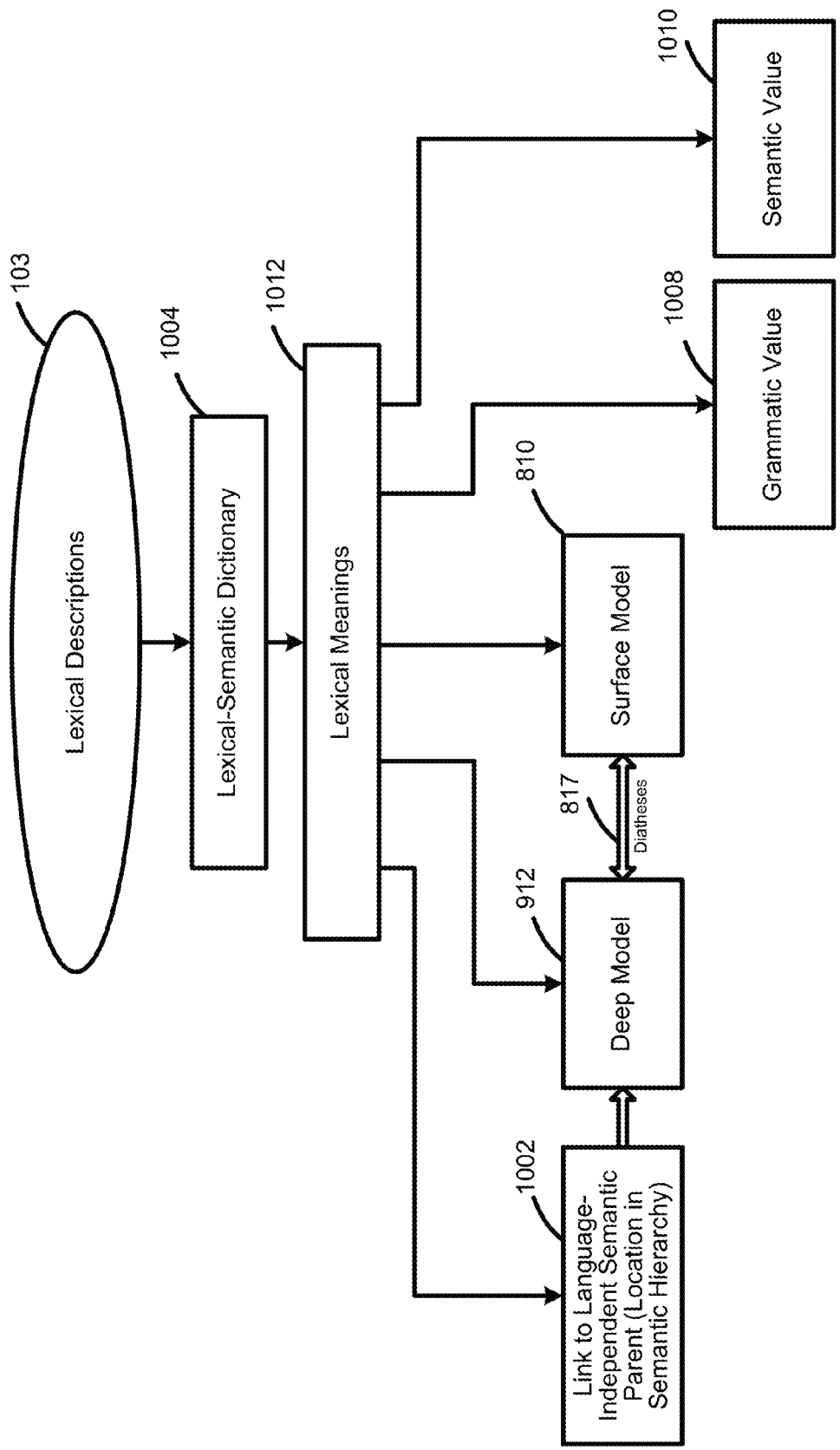
FIG. 10 is a diagram illustrating lexical descriptions according to one or more embodiments of the invention.

FIG. 10 is a diagram illustrating lexical descriptions 103 according to one exemplary implementation of the technology. The lexical descriptions 103 include a lexical-semantic dictionary 1004 that includes a set of lexical meanings 1012 arranged with their semantic classes into a semantic hierarchy, where each lexical meaning may include, but is not limited to, its deep model 912, surface model 810, grammatical value 1008 and semantic value 1010. A lexical meaning may unite different derivates (e.g., words, expressions, phrases) which express the meaning via different parts of speech or different word forms, such as, words having the same root. In turn, a semantic class unites lexical meanings of words or expressions in different languages with very close semantics.

Also, any element of language description 610 may be extracted during an exhaustive analysis of texts, and any element may be indexed (the index for the feature are created). The indexes or indices may be stored and used for the task of classifying, clustering and filtering text documents written in one or more languages. Indexing of semantic classes is important and helpful for solving these tasks. Syntactic structures and semantic structures also may be indexed and stored for using in semantic searching, classifying, clustering and filtering.

Figure 11:
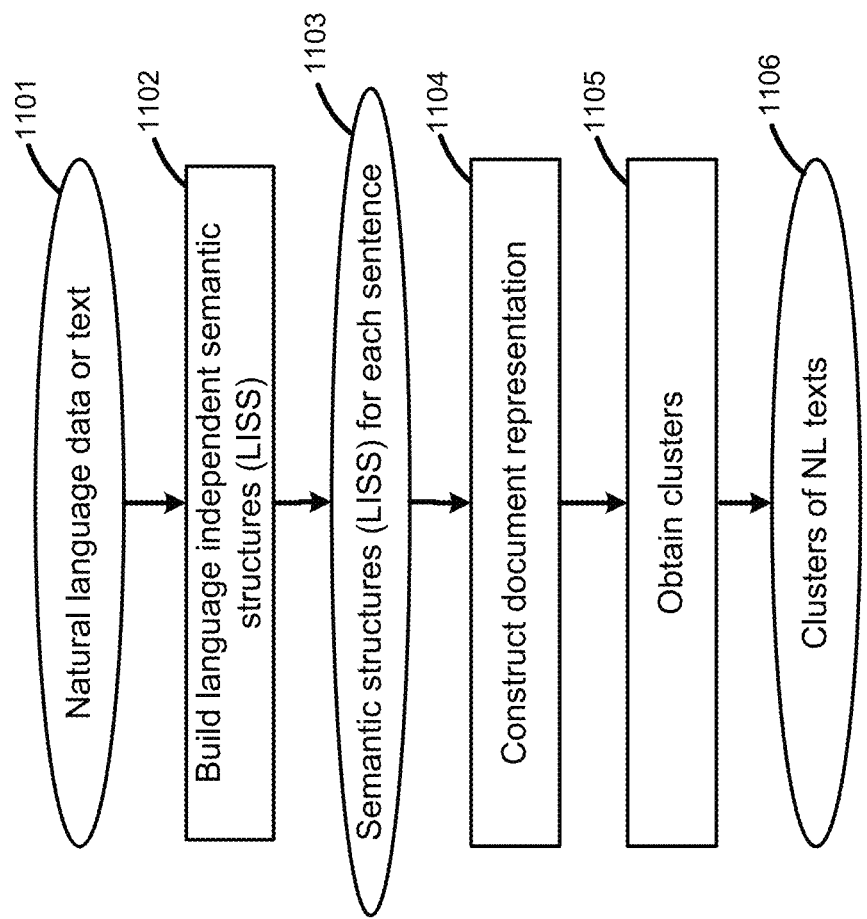
FIG. 11 is a flow diagram of a method of clustering according to one or more embodiments of the invention.

For the task of clustering a set of features and at least one criterion should be selected, the criterion may define a similarity of documents. The set of the features should include at least one feature. FIG. 11 is a flow diagram of a method of clustering. The source natural language texts 1101 or a corpora of texts are analyzed, for example, by building semantic structures 1102 to obtain labeled semantic structures 1103 where all lexical meanings and derivates are substituted by their semantic classes. Lexical ambiguities are resolved and anaphoras are completed. After that, document representations 1104 are constructed. Then, a similarity measure may be applied to calculate a distance between texts and to obtain clusters 1105. The result is a collection of clusters of natural language texts 1106.

One classification and/or clustering problem is based on the concept of similarity. There are many ways to calculate similarity between two texts. One naïve way to find out if two texts are similar is to count how many words they have in common. There are also more advanced versions of this approach such as techniques involving lemmatization, stemming, weighting, etc. For example, a vector space model (G. Salton, 1975) may be built, and vector similarity measures, such as e.g. cosine similarity, may be utilized. During the text processing described here, documents may be represented with language independent semantic classes that in their turn may be considered as lexical features. Therefore, the similarity measures as were mentioned above may be used.

Such similarity measures have a drawback in that they do not actually capture the semantics. For example, the two sentences, "Bob has a spaniel" and "Richard owns a dog" are semantically similar but they do not share any words but an article. Therefore, a mere lexical text similarity measure will fail to find that these sentences are similar. To capture this type of similarity, knowledge-based semantic similarity measures may be used. They require a semantic hierarchy to be calculated. Similarity between two words usually depends on a shortest path between corresponding concepts in a corresponding semantic hierarchy. For example, "spaniel" in the semantic hierarchy corresponding to the first sentence above appears as a child node (hyponym) of "dog", therefore semantic similarity between the concepts will be high. Word-to-word similarity measures may be generalized to text-to-text similarities by combining values for similarities of each word pair. Semantic classes described here represent nodes of semantic hierarchy. Therefore, knowledge-based semantic similarity measures described above and their generalizations to text-to-text similarity measures may be utilized within document processing.

Creating clusters of texts may be known, but usual or known systems of clustering use language-dependent parameters (for example, a set of key words), which are most representative for the texts. The present invention allows one to use for this purpose semantic classes and other semantic attributes. For example, referring to the present invention, a list of semantic classes $\{C_1, C_2, \ldots C_m\}$ may be considered as a document representation 1104. Since lexical meanings may be expressed in different words, a semantic class may unite several close lexical meanings; a semantic class embodies the idea of generalization. Synonyms and derivates are generalized. If we deal with texts in different languages, a semantic class generalizes lexical meanings of texts in different languages. In one embodiment, the frequency of the same semantic classes may be used as the criterion for clustering. In another embodiment, the frequency of "near located" semantic classes may be also used as a criterion.

The notion of "near located" semantic classes as a similarity measure may be interpreted in different ways. In the present invention, semantic classes are organized into a semantic hierarchy. So, there are several types of relationships which may link two semantic classes, for example, "parent—child", "grandparent—grandchild", "brothers", "nephew", "cousin", etc. Figuratively speaking, "degree of kinship" or a distance in the semantic hierarchy may define the similarity measure between two semantic classes. More exactly, the distance and inheritance (generally speaking) are taken into account in one embodiment of invention to measure the similarity of two semantic classes, and it may be used to get a similarity measure for the task of clustering text documents. In another embodiment, the similarity measure for the task of clustering text documents may be defined on the basis of frequency of the same (or "near located") semantic classes.

In one embodiment, the similarity measure for two or more documents may be defined heuristically or on the basis of experience. For example, if there are 2 documents—D1 and D2. After semantic analysis, there may be two sets of semantic classes $\{C_{11}, C_{12}, \ldots C_{1n}\}$ и $\{C_{21}, C_{22}, \ldots C_{2m}\}$, which are selected as most representative for these 2 texts. The principle of the choice may be different, for example most frequent classes may be selected. Each class may be supplied by or with a coefficient of the frequency $F_{ij}$ in the document. Most frequent semantic classes in a language may be excluded. These classes include such words (in English) as "the" and other articles that frequently appear in text. Most common semantic classes (like ENTITY, ABSRACT_SCIENTIFIC_OBJECT, etc.) also may be discarded. Then, a similarity measure depends on:

a) a number of cases when $C_{1i}=C_{2j}$, maybe, with taking into account the frequency of objects (words) of $C_{1i}$ and $C_{2j}$ in the language, e.g., a number objects of the same class are found in the both documents; and b) a number of cases when $C_{1i}$ and $C_{2j}$ are "near relations". For each pair $(C_{1i}, C_{2j})$ the common ancestor $C_0$ is found. Let's $p(C_0)$ is a probability to find objects of $C_0$ and all his descendants in the corpora. This value may be found statistically. Then a similarity measure of $C_{1i}$ and $C_{2j}$ is a function such as a function represented by $F(p(C_0))$. The nearer the common ancestor is located to the root of a semantic hierarchy (it means, something that is the most general, abstract) the less is the value of the similarity measure.

The said similarity measure of two documents, or distance between them, may be expressed, for example, as $$\Sigma_{i=1,n}\Sigma_{j=1,m}F(p(\text{ancestor}(C_{1i},C_{2j})))/(n*m).$$

Another problem is anaphoric construction in a text. An object in a text is often substituted by a pronoun. For example, "The algorithm is very fast, but it lacks a memory." In this case, as a result of a usual statistical analysis, the frequency of the word "algorithm" is really below the true frequency of the lexical meaning. The exhaustive syntactic and semantic analysis can correct such misrepresentation.

In still another embodiment, for more exact results (such as those generated by the methods described herein), additional methods of comparing semantic structures may be applied. It allows one to find not only similar documents in different languages, but also to identify sentences which have the same semantic structures and different syntactic structures (for example, Active and Passive).

In still other embodiments, known methods of cluster analysis may be applied. For example, hierarchical clustering based on distance connectivity may be applied. Among other methods, the following methods may be used—k-means algorithm representing each cluster by a single mean vector; methods of statistic distributions, such as multivariate normal distributions used by the Expectation-maximization algorithm; methods of density models defining clusters as connected dense regions in the data space; two-mode-clustering, where clusters are modeled with both cluster members and relevant attributes, etc.

The task of filtering is more simple when the methods described herein are used. Filtering allows one to locate documents selected by one or more criteria. The task is close to or analogous to the task of searching. But, a user can just indicate themes, topics, objects or other matters of his or her interest, and the system will adapt to select and deliver news, press and other information related to a particular indicated matter.

The present invention differs from other approaches in that it can evolve into formulating criteria that include a wide spectrum of features (parameters). The deeper properties of texts may be found and used, these deeper properties relate to semantic features, and also to lexical, syntactic and morphological features of the texts. Since semantic features, like semantic classes and sememes, are language independent, the system can filter documents written in different languages.

For example, the system can filter documents not only related to some objects, types or classes, but can select them on the basis of sentiment analysis, which consists in a selecting documents that reflect a specific attitude of an author to a subject. A specific attitude can be expressed in different ways, for example, by lexical means, but it is not known a priori which words might be used by authors. Using objects of specific semantic classes in text, or indicating during an analysis some sememes, for example, Polarity Minus, helps to interpret the attitude of a speaker or a writer with respect to some topic or the overall contextual polarity of the document. The attitude may be, for example, blaming, estimation, admiration, an emotional state (when writing), etc.

On the other hand, filtering allows one to not include documents into search results based on some chosen criteria. A good example in practice is the filtering or elimination of spam—undesired or unsolicited email messages. A user can adopt his filter using common notions, which may be expressed in terms of semantic classes, for example ADVERTISEMENT_PAPERS, PURCHASE_AND_SALE, etc.

Figure 12:
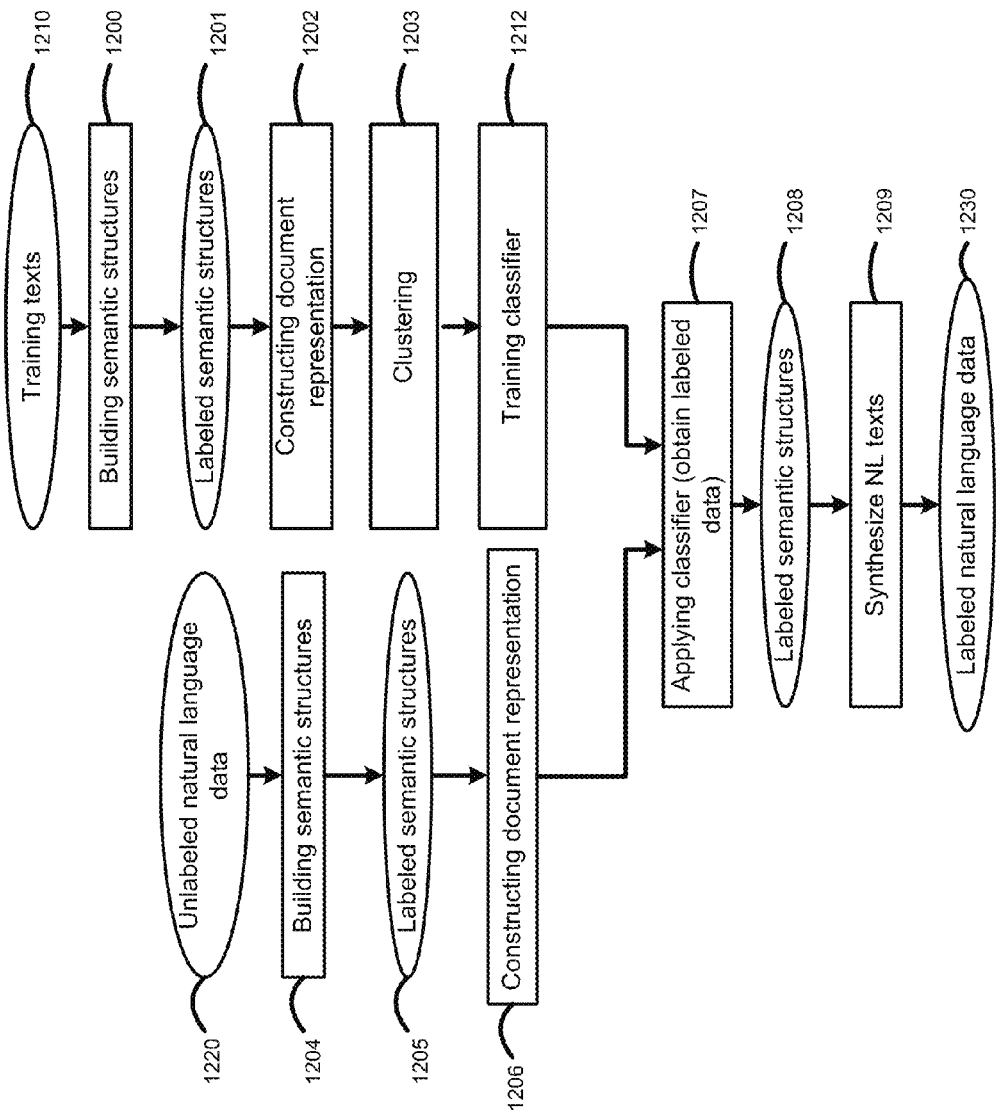
FIG. 12 is a flow diagram of a method of training a classifying system according to one or more embodiments of the invention.

In regard to classifying, one implementation of classification is a method related to supervised learning. In this case, a training set with data for which the classes are already known is required. In one embodiment, clustering is executed to get or acquire training sets. Supervised learning may be done as follows and as illustrated in FIG. 12. FIG. 12 is a flow diagram of a method of training a classification system according to one or more embodiments of the invention.

First, with reference to FIG. 12, training texts 1210 are analyzed and used to build—for each sentence in the training texts—a language independent semantic structure (LISS) that reflects semantic, morphological, syntactical and pragmatic information about the respective source text. Then, semantic structures are labeled 1201. Subsequently, an appropriate document representation 1202 is constructed. For this representation, a similarity measure is chosen to get clusters of documents. In one embodiment, a vector-space model and a similarity measure may be, for example, a cosine similarity. As result of the step of preliminary clustering 1203, a set of clusters is obtained. A classifier is built based on semantic structures 1212.

Figure 13:
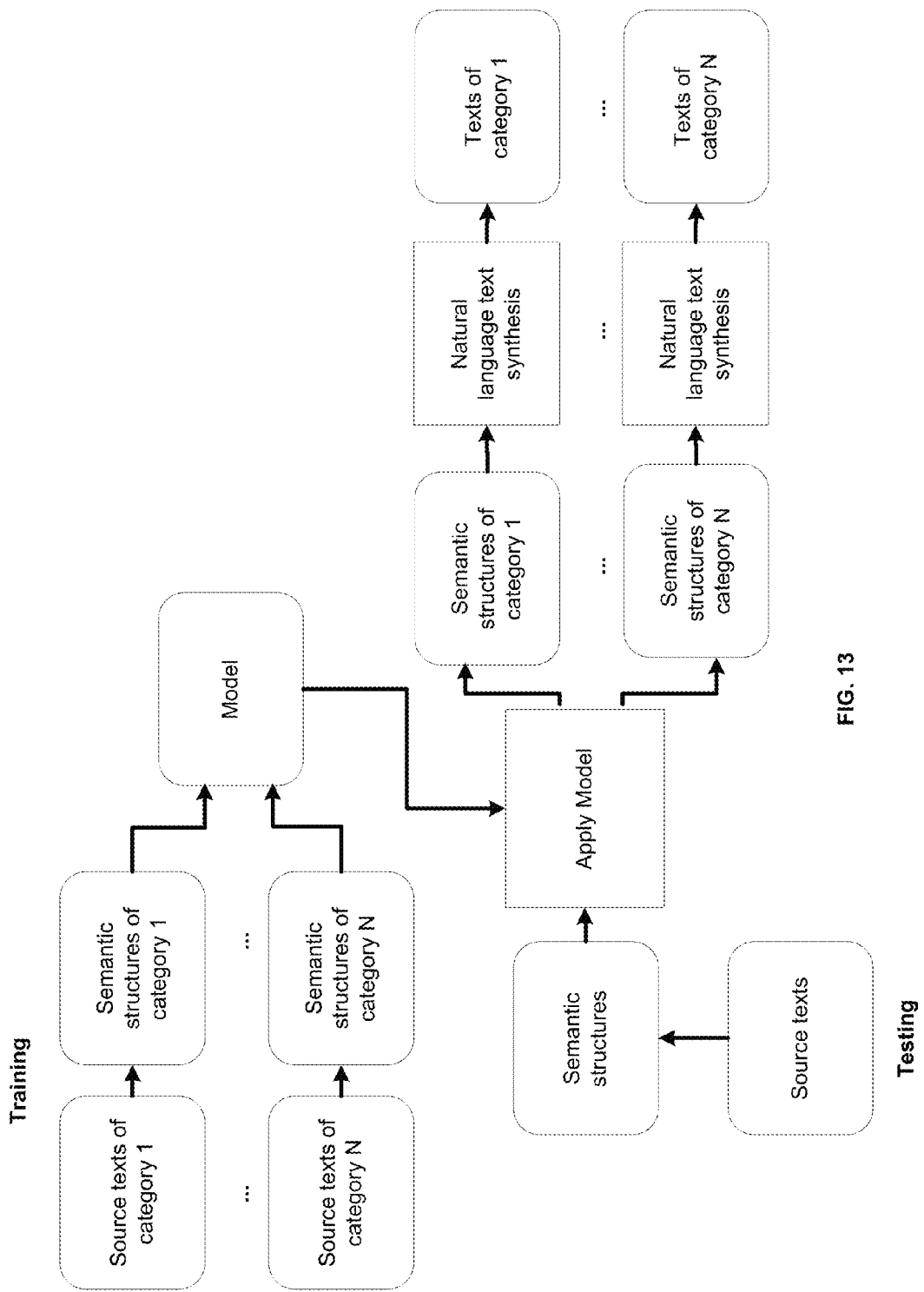
FIG. 13 is a process flow diagram illustrating categorization of texts according to one or more embodiments of the invention.

FIG. 13 is a flow diagram of another method or another portion of a method according to one or more embodiments of the invention. With reference to FIG. 13, test natural language texts of different predefined categories are analyzed, for example by building semantic structures, labeling semantic structures, and constructing a model. Sometimes, clustering of test texts is applied to determine a set of the categories. Then, one or more classifiers are applied to the test data to obtain classified data. Additional result of applying one or more classifiers is a set of classified (i.e., labeled) semantic structures. Natural language (NL) texts may then optionally be synthesized from these labeled semantic structures. Any language or set of languages may be chosen for creating synthesized texts. Results (e.g., classified natural language data) may be presented in any language or in multiple languages.

Figure 14:
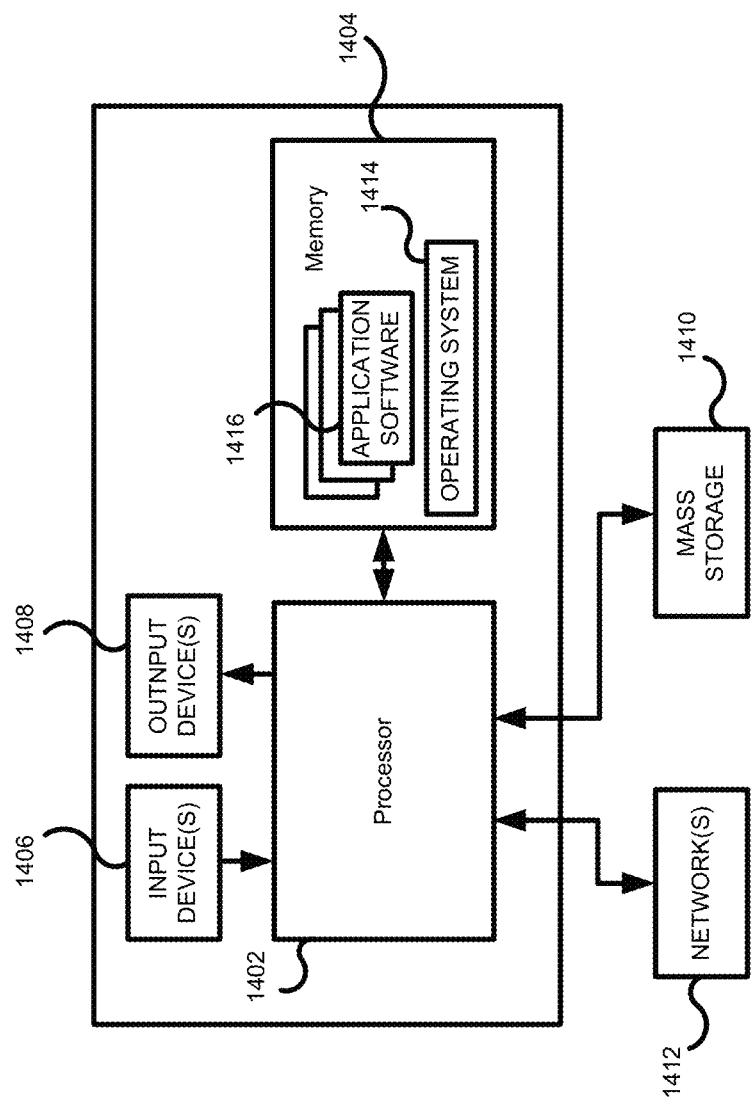
FIG. 14 shows an exemplary hardware for implementing computer system in accordance with one embodiment of the invention.

FIG. 14 shows exemplary hardware for implementing the techniques and systems described herein, in accordance with one implementation of the present disclosure. Referring to FIG. 14, the exemplary hardware 1400 includes at least one processor 1402 coupled to a memory 1404. The processor 1402 may represent one or more processors (e.g. microprocessors), and the memory 1404 may represent random access memory (RAM) devices comprising a main storage of the hardware 1400, as well as any supplemental levels of memory, e.g., cache memories, non-volatile or back-up memories (e.g. programmable or flash memories), read-only memories, etc. In addition, the memory 1404 may be considered to include memory storage physically located elsewhere in the hardware 1400, e.g. any cache memory in the processor 1402 as well as any storage capacity used as a virtual memory, e.g., as stored on a mass storage device 1410.

The hardware 1400 also typically receives a number of inputs and outputs for communicating information externally. For interface with a user or operator, the hardware 1400 may include one or more user input devices 1406 (e.g., a keyboard, a mouse, imaging device, scanner, microphone) and a one or more output devices 1408 (e.g., a Liquid Crystal Display (LCD) panel, a sound playback device (speaker)). To embody the present invention, the hardware 1400 typically includes at least one screen device.

For additional storage, the hardware 1400 may also include one or more mass storage devices 1410, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 1412 (e.g., a local area network (LAN), a wide area network (WAN), a wireless network, and/or the Internet among others) to permit the communication of information with other computers coupled to the networks. It should be appreciated that the hardware 1400 typically includes suitable analog and/or digital interfaces between the processor 1402 and each of the components 1404, 1406, 1408, and 1412 as is well known in the art.

The hardware 1400 operates under the control of an operating system 1414, and executes various computer software applications, components, programs, objects, modules, etc. to implement the techniques described above. Moreover, various applications, components, programs, objects, etc., collectively indicated by application software 1416 in FIG. 14, may also execute on one or more processors in another computer coupled to the hardware 1400 via a network 1412, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

We claim:

1. A method for a computing device to analyze, across languages, a set of texts in one or more natural languages, the method comprising for each text:

electronically analyzing the text, wherein electronically analyzing the text comprises:

performing a syntactic analysis of at least one sentence of the text, the syntactic analysis comprising a rough syntactic analysis to generate a graph of generalized constituents representing all possible variants of parsing the at least one sentence of the text syntactically, the syntactic analysis further comprising a precise syntactic analysis to generate at least one syntactic tree from the graph of generalized constituents, and selecting a preferred one of the at least one syntactic tree; and creating a language-independent semantic structure (LISS) by performing a semantic analysis of the preferred one of the at least one syntactic tree, wherein the LISS comprises an acyclic graph where each word in the sentence is represented by a corresponding one of a plurality of semantic classes, and wherein each of the semantic classes is a universal language-independent semantic notion of a respective word;

generating a set of features for the text based at least in part on the LISS;

creating at least one index for the text, wherein each value in the index relates to a corresponding one of the set of features and comprises a list of at least one of numbers or addresses of occurrences of the corresponding feature in the text; and performing text clustering based on said set of features, wherein performing the text clustering comprises assigning the text to one or more clusters.

2. The method of claim 1, wherein said analyzing comprises resolving lexical ambiguities.

3. The method of claim 1, wherein said analyzing comprises resolving anaphoras.

4. The method of claim 1, wherein said set of features comprises lexical features.

5. The method of claim 1, wherein said set of features comprises syntactic features.

6. The method of claim 1, wherein said set of features comprises grammatical features.

7. The method of claim 1, wherein said set of features comprises semantic features.

8. The method of claim 1, wherein the at least one index is for morphological, syntactic, lexical and semantic features, the at least one index being represented as a table.

9. The method of claim 1, wherein said clustering uses a similarity measure, wherein said similarity measure is based on a result of said semantic analysis.

10. The method of claim 9, wherein said similarity measure depends on distances between semantic classes in a semantic hierarchy.

11. The method of claim 10, wherein said similarity measure depends on a frequency of words related to a common ancestor of said semantic classes in said semantic hierarchy.

12. The method of claim 1, wherein analyzing the sentence of the text further comprises generating a statistic for at least one grammatical feature of the sentence of the text.

13. The method of claim 1, wherein analyzing the sentence of the text further comprises generating a statistic for at least one lexical feature of the sentence of the text.

14. The method of claim 1, wherein analyzing the sentence of the text further comprises generating a statistic for at least one syntactic feature of the sentence of the text.

15. The method of claim 1, wherein analyzing the sentence of the text further comprises generating a statistic for at least one semantic feature of the sentence of the text.

16. The method of claim 1, wherein analyzing the sentence of the text further comprises generating a statistic for at least one language independent semantic structure (LISS) of the sentence of the text.

17. The method of claim 1, wherein analyzing the sentence of the text further comprises generating a statistic for at least one semantic class of a semantic hierarchy related to the sentence of the text.

18. The method of claim 1, wherein the set of features for each text comprises generating a statistic of at least one extracted feature.

19. The method of claim 1, wherein the method further comprises making one or more of the clusters accessible to another computing device.

20. The method of claim 19, wherein clusters are located across a plurality of computing devices.

21. The method of claim 1, wherein members of the set of texts are located on a plurality of computing devices, wherein the plurality of computing devices are accessible through one or more network protocols.

22. The method of claim 17, wherein clusters comprise texts of different languages.

23. The method of claim 17, wherein clusters comprise texts of mixed languages.

* * * * *